United States Patent
Stein

(10) Patent No.: US 9,788,189 B2
(45) Date of Patent: Oct. 10, 2017

(54) METHOD AND DEVICE FOR AUTHENTICATING A MOBILE STATION ON AN ALTERNATIVE COMMUNICATIONS NETWORK

(71) Applicant: KNOWROAMING LTD, North York, ON (CA)

(72) Inventor: Mathew Stein, North York (CA)

(73) Assignee: KNOWROAMING LTD, North York, ON (CA)

( * ) Notice: Subject to any disclaimer, the term of this patent is extended or adjusted under 35 U.S.C. 154(b) by 46 days.

(21) Appl. No.: 14/766,060

(22) PCT Filed: Feb. 5, 2014

(86) PCT No.: PCT/IB2014/058800
§ 371 (c)(1),
(2) Date: Aug. 5, 2015

(87) PCT Pub. No.: WO2014/122588
PCT Pub. Date: Aug. 14, 2014

(65) Prior Publication Data
US 2015/0373530 A1 Dec. 24, 2015

Related U.S. Application Data

(60) Provisional application No. 61/760,905, filed on Feb. 5, 2013, provisional application No. 61/881,753, filed on Sep. 24, 2013.

(51) Int. Cl.
*H04W 8/18* (2009.01)
*H04W 8/08* (2009.01)
(Continued)

(52) U.S. Cl.
CPC .......... *H04W 8/183* (2013.01); *H04B 1/3816* (2013.01); *H04L 63/0853* (2013.01);
(Continued)

(58) Field of Classification Search
CPC ..... H04W 8/183; H04W 8/082; H04W 4/008; H04W 36/0016; H04W 4/003;
(Continued)

(56) References Cited

U.S. PATENT DOCUMENTS

| 2009/0305668 A1* | 12/2009 | Ahn | H04W 12/06 455/410 |
| 2010/0311402 A1* | 12/2010 | Srinivasan | H04W 8/183 455/418 |
| 2010/0311468 A1* | 12/2010 | Shi | H04W 4/003 455/558 |

FOREIGN PATENT DOCUMENTS

| DE | 103 11 980 A1 | 9/2004 |
| DE | 103 42 530 A1 | 4/2005 |

(Continued)

OTHER PUBLICATIONS

International Search Report dated Jun. 24, 2014 for Application No. PCT/IB2014/058800.
(Continued)

*Primary Examiner* — Brandon Miller
(74) *Attorney, Agent, or Firm* — Ladas & Parry LLP

(57) ABSTRACT

A method of authenticating a mobile station on an alternate communications network is disclosed, the mobile station being associated with a default communications network. The mobile station comprises a baseband processor to manage the antenna-related functions and a SIM card to accommodate a default SIM associated with the default communications network for receiving network credentials from the baseband processor. The method comprises providing a SIM card device to intercept communications between the baseband processor and the SIM card, monitoring the network credentials in respect of the network that the mobile station is actively in communication with, determining whether the mobile station needs to switch to an
(Continued)

alternate network, and identifying or receiving from a user the alternate network, consulting a SIM bank, comprising at least one alternate SIM, and selecting an alternate SIM having a mobile station identification variable compatible with the alternate network, receiving a network authentication request on the mobile station from the alternate network, and allocating the selected mobile station identification variable to the mobile station so as to identify the user of the mobile station on the alternate network.

32 Claims, 12 Drawing Sheets

(51) Int. Cl.
| | |
|---|---|
| *H04W 4/00* | (2009.01) |
| *H04W 36/00* | (2009.01) |
| *H04M 1/725* | (2006.01) |
| *H04B 1/38* | (2015.01) |
| *H04L 29/06* | (2006.01) |
| *H04W 12/06* | (2009.01) |
| *H04W 48/18* | (2009.01) |
| *H04B 1/3816* | (2015.01) |

(52) U.S. Cl.
CPC ....... *H04M 1/72525* (2013.01); *H04W 4/003* (2013.01); *H04W 4/008* (2013.01); *H04W 8/082* (2013.01); *H04W 12/06* (2013.01); *H04W 36/0016* (2013.01); *H04W 48/18* (2013.01)

(58) Field of Classification Search
CPC ................. H04W 12/06; H04W 48/18; H04M 1/72525; H04B 1/3816; H04L 63/0853
See application file for complete search history.

(56) References Cited

FOREIGN PATENT DOCUMENTS

| | | |
|---|---|---|
| EP | 2 448 301 A1 | 5/2012 |
| WO | 2006/094564 A1 | 9/2006 |

OTHER PUBLICATIONS

Espacenet English abstract of DE 103 42 530 A1.
Espacenet English abstract of WO 2004082314 A2 which corresponds to DE 103 11 980 A1.

* cited by examiner

METHOD AND DEVICE FOR AUTHENTICATING A MOBILE STATION ON AN ALTERNATIVE COMMUNICATIONS NETWORK

FIELD OF THE INVENTION

This invention relates to a system and method for authenticating a wireless device (also referred to as a mobile station (MS)) on an alternate communications network that has been selected to provide a user of the wireless with better calling and/or data rates. In an embodiment, this invention extends to a SIM card device/accessory for facilitating this authentication.

BACKGROUND TO THE INVENTION

A subscriber identification module (SIM) is an integrated circuit, typically embedded into a SIM card, which securely stores network-specific information used to authenticate and identify subscribers on the network, the network typically corresponding to a mobile/cellular telephone network. The most important information stored on the SIM includes the International Mobile Subscriber Identity (IMSI), which is used to identify a SIM card with respect to its individual operator network, the SIM's unique international circuit card identifier (ICCID) and an authentication key (Ki) used to identify and authenticate subscribers on mobile stations (such as cellular/mobile telephones and computers, although the phrase "mobile station" will generally be used in the specification to refer to such devices).

The IMSI number in turn typically comprises one or more of the following:
- a mobile country code (MCC), in terms of which use of the mobile station will be limited to one country;
- a mobile network code (MNC), in terms of which use of the mobile station will be limited to a pre-determined network, such as Orange or Vodafone, for example; and
- a mobile station identification number (MSIN) in terms of which use of the mobile station will be limited to one SIM card.

The IMSI is also used to acquire other details of the mobile station in a Home Location Register (HLR) or as locally copied in a Visitor Location Register (VLR). The HLR is a central database that contains details of each mobile station subscriber that is authorized to use the GSM core network. The VLR is a database of the subscribers who have roamed into the jurisdiction of the MSC (Mobile Switching Center) which it serves. Each base station in the network is served by exactly one VLR, hence a subscriber cannot be present in more than one VLR at a time. The data stored in the VLR has either been received from the HLR, or collected from the mobile station. Whenever a new mobile station is detected on its network, the operator not only creates a new record in its VLR, but it also updates the HLR of the mobile subscriber, apprising it of the new location of that mobile station.

The $K_i$ authentication key is a 128-bit value used in authenticating the SIMs on a mobile network. Each SIM holds a unique $K_i$ assigned to it by the operator during a personalization process. The $K_i$ is also stored in a database on the carrier's network.

The SIM card provides a software function that allows the mobile station to pass data to the SIM card to be signed with the $K_i$. This, by design, makes usage of the SIM card mandatory unless the $K_i$ can be extracted from the SIM card.

Turning now to FIG. 1, the typical authentication process, to enable a mobile station (MS) 1 to connect to a network 5, will be described. However, before doing so, at a high level and in respect of one aspect of the mobile station 1, the mobile station 1 comprises a baseband processor 2 to manage the antenna-related functions of the mobile station 1 and a SIM card 3, with the baseband processor 2 communicating with the network 5. The SIM card 3 in turn comprises a baseband only component 3.1 that can communicate with the network 5 via the baseband processor 2. The SIM card 3 further comprises a memory component 3.2. The mobile station 1 further comprises an application layer 4 to run software required to operate the mobile station 1.

With this in mind, the authentication process comprises the following steps:
1. When the mobile station 1 starts up, the application layer 4 request a connection from the baseband processor 2.
2. The baseband processor 2 then requests the mobile station's International Mobile Equipment Identity (IMEI) number, which uniquely identifies the mobile station 1, from the SIM card 3, as well as the IMSI, which then gets sent as part of a connection/authentication request to the network 5. The mobile station may have to pass a PIN to the SIM card 3 before the SIM card 3 will reveal this information.
3. The operator network searches its database for the incoming IMSI and its associated $K_i$.
4. The operator network then generates a Random Number (RAND) based on the predefined $K_i$, and from this it generates an authentication vector 1 (AV1).
5. The operator network then sends the RAND to the mobile station 1. The mobile station 1 then uses its predefined $K_i$ (which should match the $K_i$ used by the network operator) and the RAND to generate an authentication vector 2 (AV2). The mobile station 1 then passes the AV2 back to the network operator.
6. The operator network then compares AV1 and AV2, and if there is a match, mobile station 1 is granted access to the operator's network 5.

As briefly touched on above, in order to extend the connectivity service of a mobile station to a location that is different from the home location where the service was registered, the mobile station needs to undergo a roaming process. In terms of a conventional roaming process, when the mobile station is turned on or is transferred via a handover to a new network, this new "visited" network sees the mobile station, notices that it is not registered with its own system, and attempts to identify its home network. The visited network then contacts the home network and requests service information (including whether or not the mobile station should be allowed to roam) about the roaming mobile station using the IMSI number.

If successful, the visited network begins to maintain a temporary subscriber record for the mobile station. Likewise, the home network updates its information to indicate that the mobile station is on the host network so that any information sent to that mobile station can be correctly routed.

In terms of the above, it will be appreciated that the annual revenue of the cellular industry worldwide, with regard to the provision of roaming service, is estimated at well over 12 billion dollars. In this regard, income generated through roaming charges is incurred by end users making or receiving calls, data or text messages outside of their home network. In some countries networks allow users to roam anywhere in the country and not incur any surcharges for using their mobile stations. In other countries, like Canada, simply leaving the metropolitan area that you reside in can result in roaming charges being incurred. However, in almost all cases leaving the country you reside in will result in excessive roaming charges being incurred.

Turning now to the issue of interconnect charges (i.e. fees billed to a given network to terminate a call on another network), these generally represent a major barrier to entry for new market participants. Newly established networks face high interconnect charges as a result of having a relatively small market share when compared to incumbent networks. Outgoing calls from the new network's consumers are more than likely to be terminated on a competitor's network. Many of these networks must offer free incoming calls in order to attract consumers, as free incoming calls have been the de facto standard for many years. Thus, revenue is only earned when subscribers make outgoing calls. The new networks are thus under pressure, since to attract new customers these new customers must invariably switch from an incumbent network that is already offering relatively low outgoing rates (and which the incumbent network would naturally try to protect since this represents their only source of revenue).

Most networks also offer a lower rate for intra-network calls (as opposed to inter-network calls, as described in the previous paragraph) i.e. calls between subscribers on the same network, since these calls do not necessitate the need to pay interconnect fees. To take advantage of this (and thus, to a certain extent, to reduce the paying of interconnect fees), consumers carry multiple SIM cards so that people wishing to contact them always do so without having to make inter-network calls.

All of the above makes it exceedingly difficult to switch to a new provider or network and hence for new providers and networks to attract new customers. In addition, customers who have a prepaid plan with a new network still retain the SIM cards of the incumbent network. In view of cost fluctuations in the price of minutes, the availability of minutes at a given retailer or other factors, consumers are less likely to consistently purchase new minutes on the new network. In addition, users cannot simply forward their calls to the new network's SIM/number without incurring a call forwarding cost.

Of further relevance to the context of the present invention, are so-called mobile virtual network operators. A mobile virtual network operator (MVNO) is a wireless communications services provider that does not own the radio spectrum or wireless network infrastructure over which the MVNO provides services to its customers. An MVNO enters into a business agreement with a mobile network operator to obtain bulk access to network services at wholesale rates, and then sets retail prices independently. An MVNO may use its own customer service and billing support systems and its own customer service, marketing and sales personnel. The MVNO business model is one in which no significant capital expenditure on spectrum and infrastructure is incurred. In addition, MVNOs do not have the time-consuming task of building out extensive radio infrastructure. The relevance of MVNOs to the present invention will become clearer further on in the specification.

MVNOs may be classified as either a reseller MVNO or a Full Infrastructure MVNO, with the former simply being a branding entity with neither its own mobile licence or its own mobile infrastructure, whilst the latter does indeed have its own mobile licence and/or mobile infrastructure. In both cases, the MVNO has the direct customer relationship with the end user. The MVNO is able to handle Network Routing themselves and will typically have entered into roaming deals with foreign MNOs. The MVNO is often able to produce and distribute for example voice minutes and data traffic, typically by tagging onto their existing fixed line operation, and the MVNO will typically be able to handle producing SMS and MMS messages. A typical MVNO will be able to handle customer service, customer billing and collection of consumption data and handset management. Furthermore the MVNO will usually handle marketing and sales to end-users themselves.

OBJECT OF THE INVENTION

An object of the invention is to provide a system, method and SIM card device for authenticating a mobile station on an optimum communications network, in order to overcome high roaming charges. Current roaming solutions require the user to swap out their SIM card or carry an additional mobile device, which is impractical and inconvenient. In addition, it is difficult to manage multiple SIM cards as they expire or get lost. In addition, there is a problem in respect of incoming calls, which existing roaming solutions do not adequately address. Finally, data has become more important than voice, with current international SIM cards are voice focused and do not offer competitive data rates, which is a further shortcoming of existing solutions that the present invention aims to address.

SUMMARY OF THE INVENTION

In broad terms, and at a high level, the present invention relates to a virtual SIM (VSIM) card for a mobile station/device, which is not a traditional SIM card, but is able to change its identity dynamically. In use, the VSIM card is coupled to a SIM bank, which may take the form of a another mobile station or device, a physical server or a second/third SIM card slot on a mobile device, from which the VSIM is able to obtain its identity credentials. This technology comes in a variety of embodiments, including a VPP-punched VSIM, a VSIM with an external communication module, and a "user shared" SIM structure.

According to a first aspect of the invention, there is provided a method of authenticating a mobile station on an alternate (or optimum) communications network, the use of the mobile station being associated with a default (or home) communications network, the mobile station comprising a baseband processor to manage the antenna-related functions of the mobile station and a SIM card to accommodate a default (or home) SIM associated with the default communications network for receiving network credentials from the baseband processor, the method comprising:
  providing a SIM card device to intercept communications between the baseband processor and the SIM card;
  monitoring the network credentials in respect of the network that the mobile station is actively in communication with;
  determining whether the mobile station needs to switch to an alternate network, and identifying or receiving from a user the alternate network;
  consulting a SIM bank, comprising at least one alternate (or optimum) SIM, and selecting an alternate SIM having a mobile station identification variable compatible with the alternate network;
  receiving a network authentication request on the mobile station from the alternate network; and
  in response to the mobile station being authenticated on the alternate network, allocating the selected mobile station identification variable to the mobile station so as to identify the user of the mobile station on the alternate network.

In an embodiment, once authenticated on the alternate network, the method further comprises:
receiving network credentials for the default network;
logging onto the default network to receive incoming calls and/or data intended for the default SIM; and
forwarding the received incoming calls and/or data to the alternate SIM via the alternate network.

In an embodiment, the step of determining whether the mobile station needs to switch to an alternate network comprises either receiving a request from the user to switch to the alternate network or determining that the mobile station is deemed to be roaming.

In an embodiment, the step of receiving a network authentication request on the mobile station from the alternate network includes the steps of:
the SIM bank relaying the device identification variable to the SIM card device/module;
the alternate network issuing a device authentication request to the mobile station in the form of a random number;
relaying the random number to the SIM bank;
running the random number against an integer stored in the SIM bank to produce a decryption variable;
transmitting the decryption variable to the SIM card device/module and to the alternate network;
the alternate network then comparing the received decryption variable with an internally stored decryption variable to determine whether there is a match,
in response to the received decryption variable matching with said internally stored decryption variable, authenticating the mobile station on the alternate network.

In one embodiment, the SIM bank is an external SIM bank on a SIM server.

In an embodiment that makes use of an external SIM bank, the SIM card device/module comprises:
a pseudo-SIM card that can be fitted to a conventional SIM card receiver within the mobile station;
a SIM receiver to accommodate the default SIM;
a first communications module and associated antenna to enable the SIM card device/module to communicate with the SIM bank; and
a processor to monitor the network credentials and determine whether the mobile station needs to switch to the alternate network.

In an alternate embodiment, the SIM bank is integrated into the mobile station, with the SIM card device/module comprises:
a body having an alternate SIM embedded therein, the alternate SIM being associated with the alternate network;
a SIM receiver for receiving or accommodating the default SIM associated with the default network, the default SIM comprising network credentials;
circuitry to connect the alternate and default SIMs to each other (either physically or wirelessly) and to the rest of the mobile station; and
a second communications module to extract the network credentials from the default SIM and to transmit the credentials to a remote gateway.

In an embodiment, the SIM receiver is integral or separate (yet connected, with the circuitry) from the body.

In an embodiment, the SIM receiver is arranged to receive or accommodate at least one further default SIM associated with further default networks and with each further default SIM also comprising network credentials for the further default networks, with the second communications module being arranged to extract the network credentials from the further default and to transmit these credentials to the remote gateway.

In all embodiments, the network credentials include, but are not be limited to, IMSI numbers, (bearing in mind that that mobile network operators connect mobile telephone calls and communicate with their market SIM cards using their IMSIs), $K_i$ or other authentication credentials and serial information in respect of the second SIM.

In an embodiment, the method further comprises detecting when a network orientated message (including but now limited to, an SMS message or a USSD message) has arrived on the user's default SIM, reading the network orientated message, storing the message in a database, and then sending the message to the user's alternate SIM at a designated "message sending" time.

In an embodiment, the SIM card device is located between the baseband processor and the SIM card for intercepting communications between the baseband processor and the SIM card so as to authenticate the mobile device on the alternate communications network.

In an embodiment, the SIM card device comprises an overlay that can be secured to the SIM card, the overlay comprising:
a communications processor, in which firmware is embedded;
a substrate upon which the communications processor is mounted and wires are routed; and
pads that allow for the communications processor to send/receive information to/from the mobile station.

In an embodiment, the method comprises the step of updating the firmware on the communications processor, the communications processor comprising a plurality of memory blocks, each memory block governing an instruction or function associated with the overlay, the method comprising:
receiving an update message from a remote communications module, the update message comprising the address of the memory block in the communications processor to be updated and a matching list of replacement data that is to replace the existing data in the respective memory block;
stalling the baseband processor by requesting more processing time;
instructing the communications processor to erase the data at the address in the memory block that is to be updated;
instructing the communications processor to write the replacement data into the address of the memory block; and
once the replacement data has been written into the relevant memory block, instructing the baseband processor to return to normal operating state.

According to a second aspect of the invention, there is provided a SIM card device for authenticating a mobile station on an alternate (or optimum) communications network, the use of the mobile station being associated with a default (or home) communications network, the mobile station comprising a baseband processor to manage the antenna-related functions of the mobile station and a SIM card to accommodate a default (or home) SIM associated with the default communications network for receiving network credentials from the baseband processor, the SIM card device comprising a processor to:

monitor the network credentials in respect of the network that the mobile station is actively in communication with;

determine whether the mobile station needs to switch to an alternate network, and identifying or receiving from a user the alternate network;

consult a SIM bank, comprising at least one alternate (or optimum) SIM, and selecting an alternate SIM having a mobile station identification variable compatible with the alternate network;

receive a network authentication request on the mobile station from the alternate network; and in response to the mobile station being authenticated on the alternate network, allocate the selected mobile station identification variable to the mobile station so as to identify the user of the mobile station on the alternate network.

In an embodiment, once authenticated on the alternate network, the processor is arranged to:

receive network credentials for the default network;

log onto the default network to receive incoming calls and/or data intended for the default SIM; and forward the received incoming calls and/or data to the alternate SIM via the alternate network.

In one embodiment, the SIM bank is an external SIM bank on a SIM server.

In an embodiment that makes use of an external SIM bank, the SIM card device comprises:

a pseudo-SIM card that can be fitted to a conventional SIM card receiver within the mobile station;

a SIM receiver to accommodate the default SIM;

a first communications module and associated antenna to enable the SIM card device/module to communicate with the SIM bank; and a processor to monitor the network credentials and determine whether the mobile station needs to switch to the alternate network.

In an alternate embodiment, the SIM bank is integrated into the mobile station, with the SIM card device comprising:

a body having an alternate SIM embedded therein, the alternate SIM being associated with the alternate network;

a SIM receiver for receiving or accommodating the default SIM associated with the default network, the default SIM comprising network credentials;

circuitry to connect the alternate and default SIMs to each other (either physically or wirelessly) and to the rest of the mobile station; and a second communications module to extract the network credentials from the default SIM and to transmit the credentials to a remote gateway.

In an embodiment, the SIM receiver is integral or separate (yet connected, with the circuitry) from the body.

In an embodiment, the SIM receiver is arranged to receive or accommodate at least one further default SIM associated with further default networks and with each further default SIM also comprising network credentials for the further default networks, with the second communications module being arranged to extract the network credentials from the further default and to transmit these credentials to the remote gateway.

In all embodiments, the network credentials include, but are not be limited to, IMSI numbers, (bearing in mind that that mobile network operators connect mobile telephone calls and communicate with their market SIM cards using their IMSIs), $K_i$ or other authentication credentials and serial information in respect of the second SIM.

In an embodiment, the SIM card device is located between the baseband processor and the SIM card for intercepting communications between the baseband processor and the SIM card so as to authenticate the mobile device on the alternate communications network.

In an embodiment, the SIM card device comprises an overlay that can be secured to the SIM card, the overlay comprising:

a communications processor, in which firmware is embedded;

a substrate upon which the communications processor is mounted and wires are routed; and pads that allow for the communications processor to send/receive information to/from the mobile station.

In an embodiment, the SIM card device comprises a local communications manager (LCM) to receive an update message from a remote communications module (RCM) to update the communications processor's firmware.

In an embodiment, the communications processor comprises a plurality of memory blocks, each memory block governing an instruction or function associated with the overlay.

In an embodiment, each update message sent by the RCM comprises the address of the memory block in the communications processor to be updated and a matching list of replacement data that is to replace the existing data in the respective memory block.

In an embodiment, the LCM, upon receiving the update message, determines the address of the memory block in the communications processor to be updated and prepares the overlay for the update. In this regard, the LCM is arranged to:

stall the baseband processor by requesting more processing time;

instruct the communications processor to erase the data at the address in the memory block that is to be updated;

instruct the communications processor to write the replacement data into the address of the memory block; and once the replacement data has been written into the relevant memory block, instruct the baseband processor to return to normal operating state.

In an embodiment, if the communications processor does not allow for the erasing of a single byte, the LCM is arranged to first back up the extra data that is erased. At the time of writing the replacement data, if an entire block of memory had to be erased, the LCM at this point instructs the communications processor to write the backed-up remaining bytes.

In an embodiment, the RCM comprises a SMS/USSD gateway or system capable of relaying the update message to the LCM via either the mobile device's baseband processor or the SIM card.

BRIEF DESCRIPTION OF THE DRAWINGS

The invention will be described, by way of example only, with reference to the accompanying drawings in which.

DETAILED DESCRIPTION OF THE DRAWINGS

Figure 1:
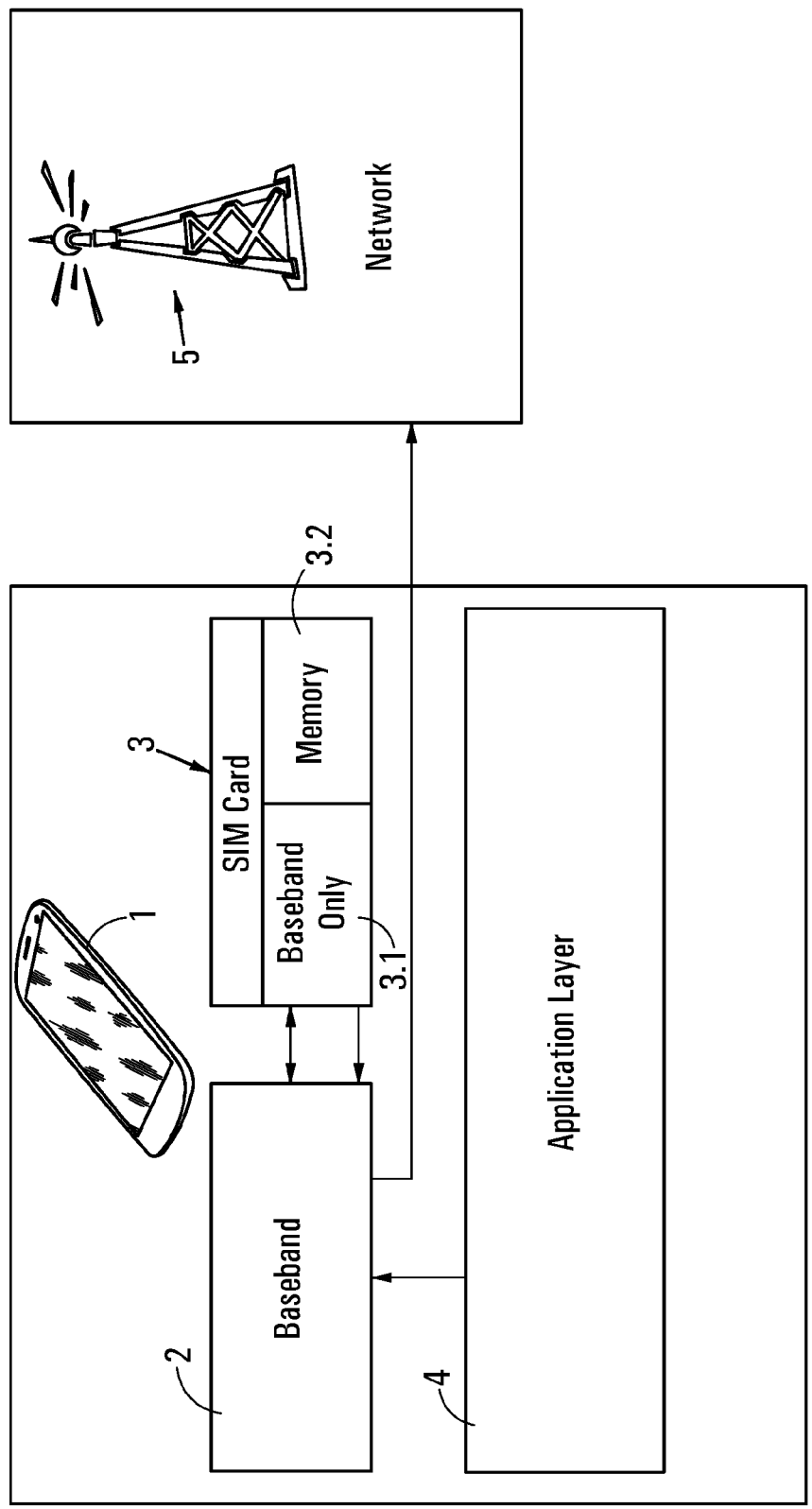
FIG. 1 shows a high level block diagram of the components in a mobile device used to connect the mobile device to a communications network, in accordance with a conventional, well known technique.
Figure 2:
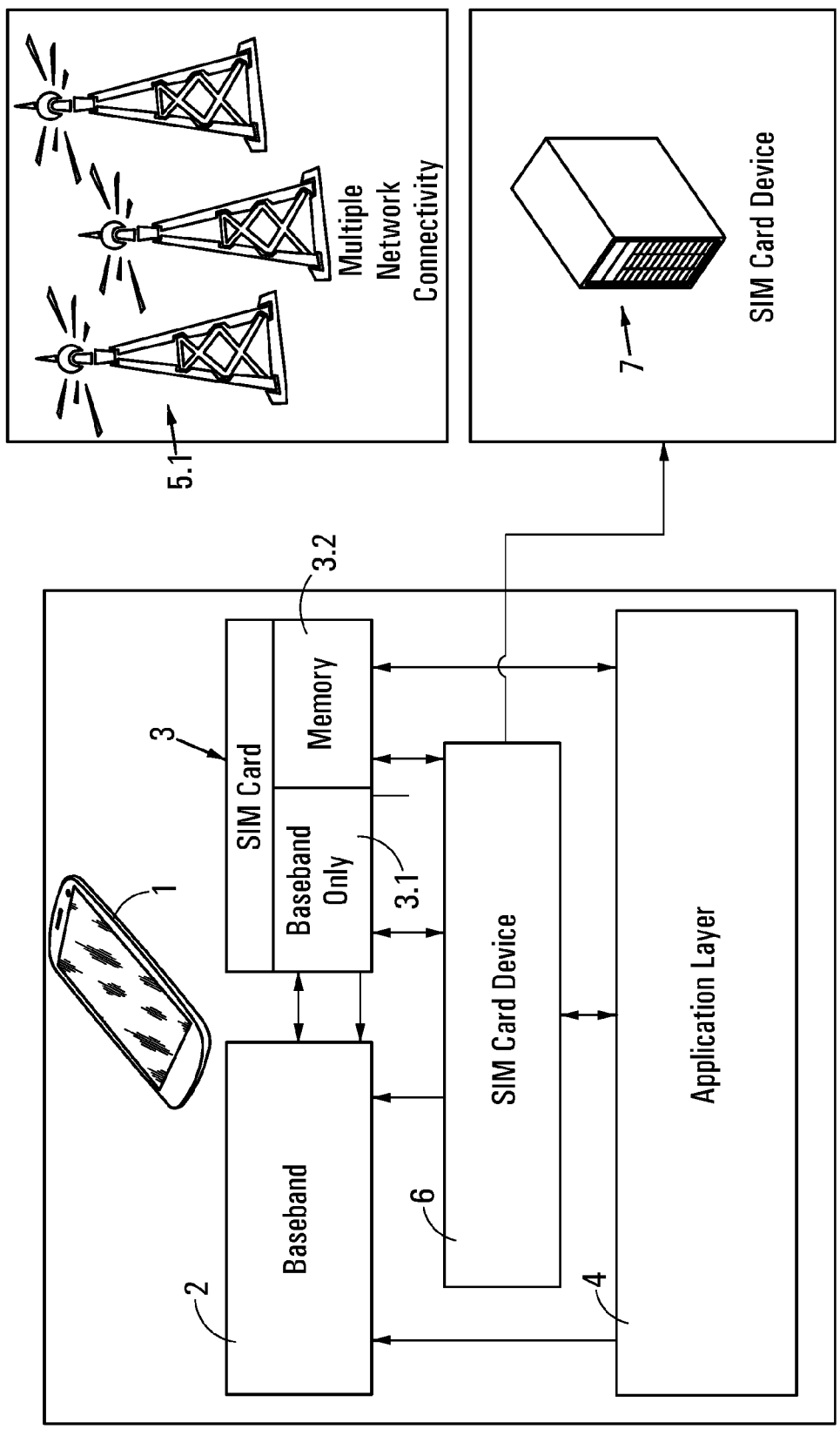
FIG. 2 shows a high level block diagram of the components in a mobile device used to connect the mobile device to a communications network, in accordance with a first embodiment of the present invention.

FIG. 2 is substantially similar to FIG. 1 (with similar components being numbered similarly), save for a SIM card device 6 located between the baseband 2 and the SIM card 3, to intercept communications between these two components. Thus, and with reference to the authentication process already described above with reference to FIG. 1, after the application layer 4 requests a connection from the baseband processor 2, the SIM card device 6 will communicate with a (in this case, external) SIM bank 7, which in turn has SIM card profiles (including Ki, IMSI and authentication algorithm information) for a plurality of communications networks 5.1. In this version, the SIM bank 7 will determine the optimum SIM card profile for the user, to ultimately enable the user to make of use relatively lower local call rates, as compared to roaming rates, and to receive forwarded calls. The use of the SIM card device 6 and associated external SIM bank 7 will be described in more detail further below with reference to FIGS. 3 and 4.

In broad terms, the forwarding of calls may be done in one of three ways, as follows:

USSD String

This corresponds to a conventional way of forwarding calls, in which a USSD string is submitted to forward the call to a local number at a VOIP server. The user thus pays for this call transfer to the VOIP i.e. for the first leg of the call. Thereafter, as part of the second leg of the call, the call is carried over VOIP to the local number being used by the user.

Virtualising User's Home SIM Card

As will be described in more detail further below with reference to FIGS. 5 and 6, the user' home/default SIM card may be virtualized and put onto a gateway, with the call then being carried over VOIP to the local number used by the user. Advantageously, in this scenario, there is only one leg in the call forwarding process, which the user does not need to pay for in any event.

Use of the VLR (or Virtual VLR)

Traditionally, each SIM has one IMSI that is tied to an HLR. When a user travels (i.e. roams) with his/her mobile station, the mobile station connects with a foreign HLR, and thus puts the mobile station into a VLR. With the present invention, a user may have multiple IMSIs on the SIM, and thus the SIM may be tied to multiple HLRs. Thus, when a user roams, it is not necessary for the mobile station to go to a foreign HLR's VLR. Instead, the foreign HLR may become the mobile station's new "home" HLR by changing its identity. The VLR may then, in use, receive calls and SMSs and forward them to the active SIM (i.e. the selected SIM on the new/alternate network). The advantage of this is that the mobile station is no longer deemed to be roaming.

In broad terms, therefore, the solution of the present invention provides a virtual SIM technology that is able to pass credentials in real time to authenticate a device either remotely (with reference to FIGS. 3 and 4) or locally on the device (with reference to FIGS. 5 to 16). In particular, the virtual SIM technology of the present invention monitors and intercepts the communication between the baseband processor and the SIM card, and seamlessly switches the mobile device to another SIM card or SIM card profile (namely, Ki, IMSI and the related authentication algorithm information), and, in some cases, forwards received calls to the new SIM card or SIM card profile. The basis of the technology is to enable users to access and automatically switch to cheaper rates when using network services.

As will be discussed in more detail further on in the specification, this may be achieved either with or without network cooperation. With network cooperation, the network/s provide (or at least readily make accessible) all the required information for accessing their network/s, which confidential information may then be stored on hardware/server (with reference to FIGS. 3 and 4) or on an overlay/sim card device (with reference to FIGS. 5 to 16). Thus, in this case, the technology of the present invention is applied to the user's home/default SIM card and virtualizes the home SIM and intelligently produces the identity of the appropriate new SIM card.

Without network cooperation, in both cases, the authentication happens in real time and the technology virtualizes the SIM card to authenticate to a network and presents itself to the mobile station and the network as one SIM card. Thus, in this case, a SIM card is transferred from one device to another without network co-operation.

Figure 3:
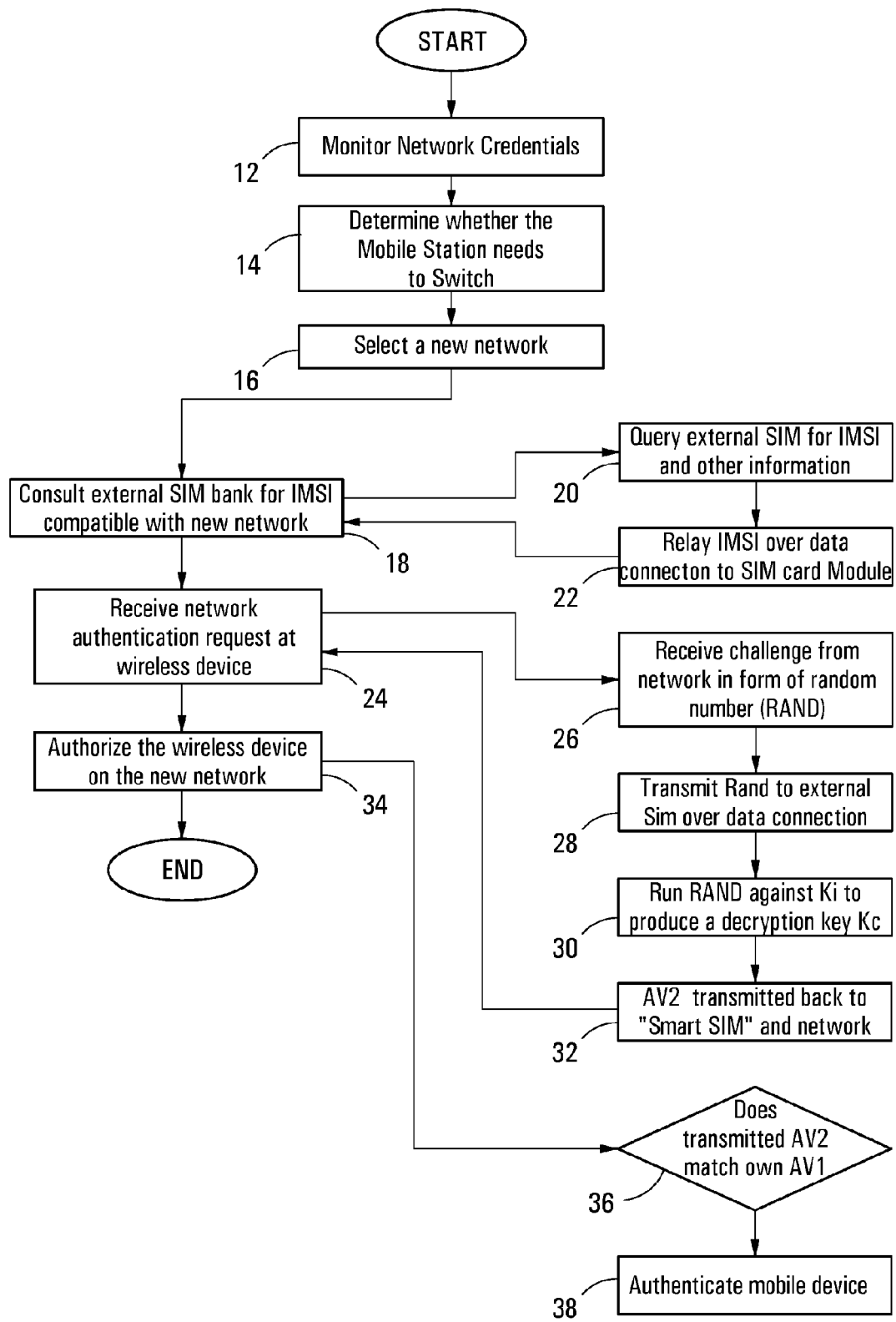
FIG. 3 shows a method of authenticating a mobile station on a communications network, in accordance with a further embodiment of the invention.

With reference to FIG. 3, a method of authenticating a mobile station, in accordance with a first aspect of the invention, is generally indicated by reference numeral 10. The method typically relates to a mobile station, typically a GSM compatible mobile phone, which is initially associated with a default (or home) communications network. As described above, the mobile station comprises a baseband processor to manage the antenna-related functions of the mobile station and a SIM card device to accommodate a default (or home) SIM associated with the default communications network for receiving network credentials from the baseband processor.

The method 10 comprises, at block 12, continuously monitoring the network credentials in respect of the network that the mobile station is actively in communication with. At block 14, the method 10 comprises determining whether the mobile station needs to switch to an alternate network, and identifying or receiving from a user the alternate network.

At block 16, the user of the mobile station or an application on the mobile station or a remote server will select an alternate GSM network. At block 18, a SIM bank comprising at least one alternate SIM card is consulted to obtain a new device identification variable in the form of an International Mobile Subscriber Identity (IMSI) number (the requested IMSI being compatible with the cellular network which covers the present location of the mobile station).

In particular, the SIM bank is queried at block 20 for the new IMSI number as well as additional information. At block 22, the new IMSI number is relayed over a data connection to the SIM card device within the mobile device.

At block 24, a network authentication request is received at the mobile station. More particularly, a network authentication request in the form of a challenge is issued by the network to the mobile station, in the example form of a random number (RAND), as shown in block 26. As described above, the operator network then generates an authentication vector 1 (AV1) based on a predefined $K_i$. At block 28, the random number (RAND) is transmitted back to the external SIM bank over an unspecified data connection. At block 30, the RAND number is run against an integer stored in the SIM bank with respect to the alternate SIM (the variable Ki) to generate an authentication vector 2 (AV2), which includes a decryption key (the variable Kc). At block 32, AV2 is transmitted back to the SIM card device and back to the communications network.

The mobile station is then authorized on the new network, at block 34. More particularly, the authentication variable AV2, which has been received on the network, is compared to authentication vector AV1 belonging to the network to determine whether there is a match, at block 36. If there is a match, the mobile station is granted access to the new network at block 38 and the process ends. The received Kc variable will be used to encrypt all further communications between the mobile station and the new, alternate network.

Figure 4:
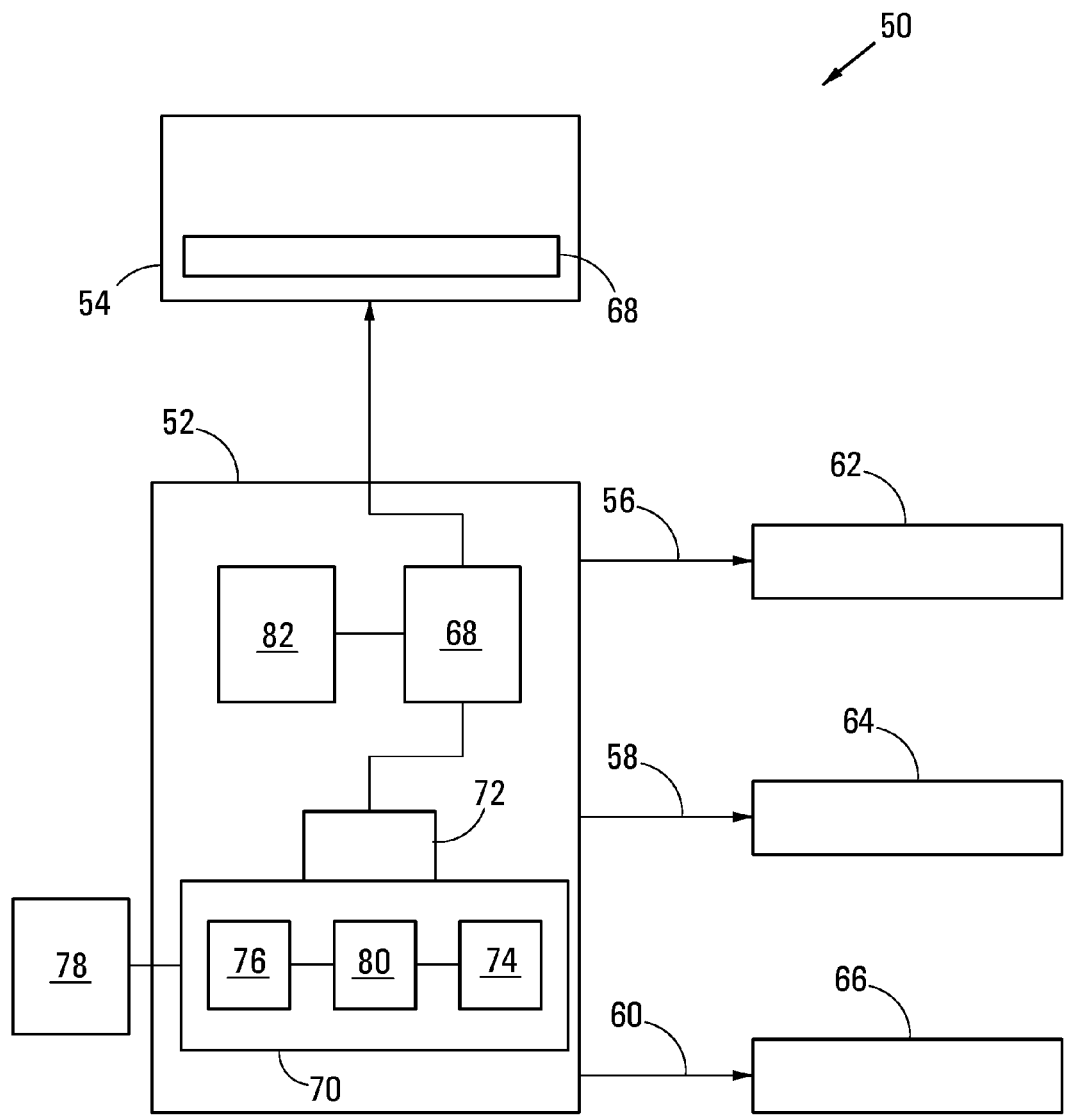
FIG. 4 shows a diagrammatic view of a system for authenticating a mobile station on a communications network, in accordance with yet a further embodiment of the invention.

With reference to FIG. 4, a system in accordance with an embodiment of the present invention is generally indicated by reference numeral 50. The system 50 consists of a mobile station 52 in the form of a mobile phone (in the example form of a Global System for Mobile Communications (GSM) compliant mobile handset), an external SIM bank 54 and a plurality of communication links (in the example form of GSM links) 56, 58, 60 to a plurality of associated alternate cellular networks 62, 64 and 66.

In turn, the external SIM bank 54 comprises a memory bank 68 including a plurality of unallocated device identification variables (in the example form of a plurality of International Mobile Subscriber Identity (IMSI) numbers).

Further to the above, the mobile station 52 comprises a baseband 68 to manage the antenna-related functions of the mobile station 52. Typically, the baseband 68 is a device (either a chip or part of a chip) in a network interface that manages all functions that require an antenna, which may or may not include Wi-Fi and/or Bluetooth). The baseband 68 is in communication with a SIM card device 70 that in turn comprises a pseudo-SIM card 72 that can be fitted to a conventional SIM card receiver within the mobile station, a SIM receiver 74 to accommodate the default (home) SIM, an optional first communications module 76 and associated antenna 78 to enable the SIM card device 70 to communicate directly with the SIM bank 54 (if necessary), and a processor 80 to monitor the network credentials and determine whether the mobile station needs to switch to the alternate/optimum network (as described above with reference to FIG.

3). A software application 82 is provided to execute programmed instructions for operating the mobile station 52.

Conventionally, as shown in FIG. 1, the baseband 68 would communicate directly with the mobile device's SIM card. However, with the present invention, the SIM card device 70 acts as a middleman between the default/home SIM card and the baseband, thus enabling it to intercept and monitor all data (network credentials in particular) being exchanged between the baseband 68 and the default SIM card (fitted within the SIM receiver 74).

The invention has so far described an external SIM bank on a SIM server (for example). However, in an alternate embodiment, the SIM bank may be integrated into the mobile station itself, as will now be described with reference to FIG. 5. A device 100 for use within a mobile station (MS), typically a cellular/mobile telephone, is shown. The device 100 comprises a body or casing 102 having an alternate/optimum SIM 104 embedded therein. Although SIM has been defined above as being an integrated circuit, typically embedded into a SIM card, the alternate SIM may comprise circuitry or software that emulates the functionality of a SIM (such as a software-SIM), with the credentials of a real SIM then being burnt onto the circuitry or software.

The device 100 further comprises a SIM receiver 106 for receiving or accommodating a default/home SIM 108 (i.e. the user's SIM) associated with a default (or home) network. The default SIM 108 comprises network credentials comprising, but not limited to, the IMSI number (bearing in mind that that mobile network operators connect mobile phone calls and communicate with their market SIM cards using their IMSIs), Ki or other authentication credentials and serial information in respect of the default SIM 108. The extraction of Ki may advantageously allow for the running of the authentication process directly on the device 100 itself, as opposed to sending it to a server (such as the SIM bank server) for generation.

In an embodiment, the SIM receiver 106 is arranged to receive or accommodate at least one further default SIM associated with further default (or incumbent) networks and with each further SIM also comprising network credentials for these further networks. In such a case, the SIM receiver 106 takes the form of a multi-slot SIM holder.

The device 100 further comprises circuitry to connect the alternate and default SIMs to each other, typically by means of a processing component 110, and to the rest of the mobile station, which may be done either physically (as indicated by wires 112 in FIG. 3) or wirelessly. The processing component 110 may comprise a microcontroller, FPGA, or similar and is used to control communications between the various items in the device.

The device 100 further comprises a second communications module 114, typically a transceiver module, to extract the network credentials from the default SIM 108 and to transmit the credentials to a remote gateway 116. The remote gateway 116 will be explained and described in more detail below with reference to FIG. 4. The second communications module 114 also allows for communication with the mobile network operator, and allows for communication over IP. The module need not be a single system, and instead could be comprised of two separate modules connected by wired or wireless means.

In the event of the SIM receiver 106 accommodating at least one further SIM, the second communications module 114 is arranged to extract the network credentials from the further SIMs and to transmit these credentials to the remote gateway 116.

In an embodiment, the body 102 comprises a substrate, such as a printed circuit board (PCB) covered by an overlay. Again, the body 102 need not be a single body or casing, but it could be segregated into multiple cases connected by wired or wireless means. However the case is designed, it will have embedded into it a means by which it can communicate with the user's mobile device. This could be through Bluetooth, USB or any other wired/wireless means of communication.

In an embodiment, the alternate SIM 104 is associated with a new/alternate network wishing to move a consumer, who is a subscriber of the default, incumbent network, away from the incumbent network. The alternate SIM 104 may also be associated with an MVNO, which will be described in more detail further on in the specification.

In an embodiment, the SIM receiver 106 is integral with (as shown in FIG. 3), or separate (yet connected, with the circuitry) from, the body 102.

Figure 5:
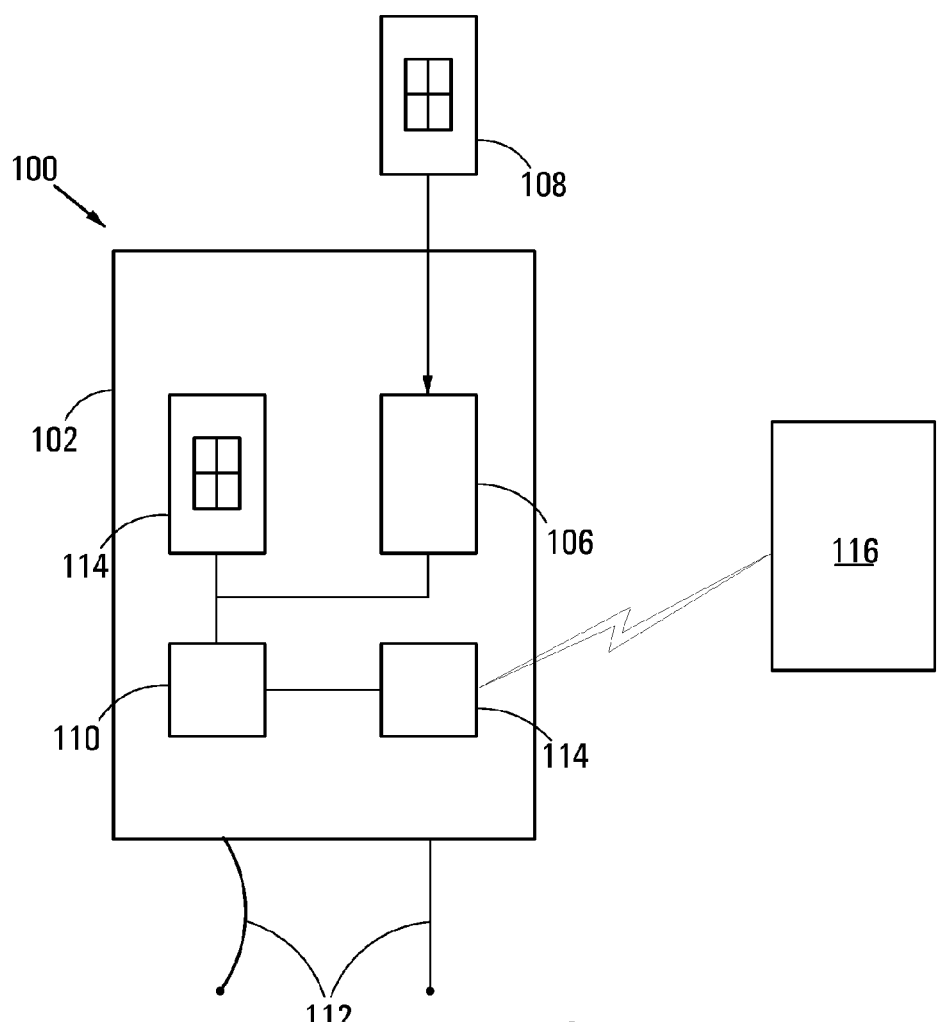
FIG. 5 shows a schematic view of a device for use within a mobile station, in accordance with a further embodiment of the invention.
Figure 6:
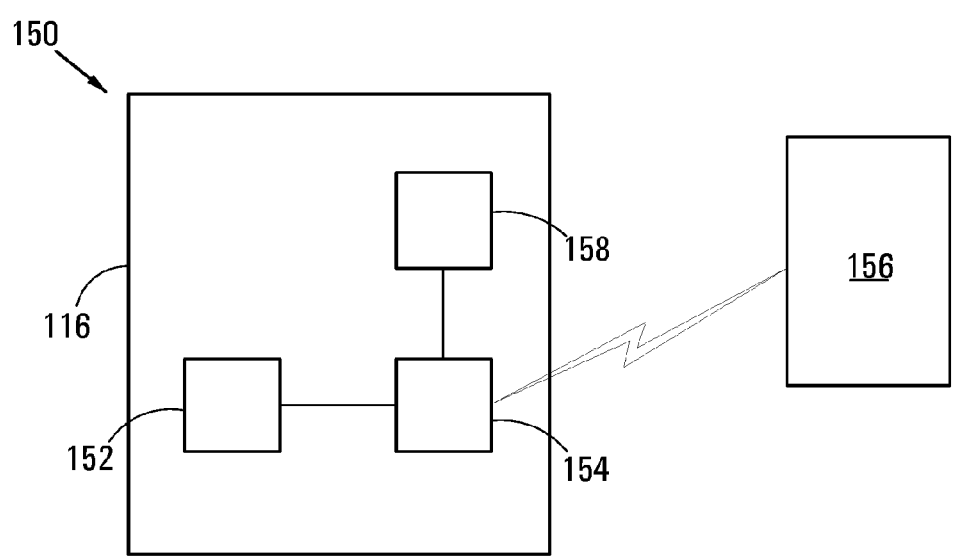
FIG. 6 shows a diagrammatic view of a system for authenticating a mobile station on a communication network, in accordance with yet a further embodiment.

Turning now to FIG. 6, a system 150 for operating the device 100 shown in FIG. 5, is shown. The system 150 comprises a gateway 116 (as described with reference to and as shown in FIG. 5) that is remote from the device 100. The gateway 116 comprises a third communications module 152 for communicating with the second communications module 114 of the device 100.

The gateway 116 further comprises a processor 154, which is connected or connectable to the third communications module 152, which is arranged to receive the network credentials from the default SIM 108 as extracted by the second communications module 114. Any one of a number of communications protocols may be used to facilitate this communication, such as USSD, the internet or a similar wireless medium.

The gateway 116 further comprises a remote registration server that includes information such as:
1) The users' current IP address
2) Whether they are willing to share their SIM card.
3) Details regarding their plan (provider, available minutes etc).
4) Any restrictions on when their SIM card is available for use.

The purpose of the registration server is not only to facilitate communication between users but also to prevent SIM card access without permission. Users will be able to form "groups" and only those who are part of the group will be able to gain access to another's SIM card.

The processor 154 is further arranged to log onto the default network 156 to receive incoming calls to the user's default number, with the processor 154 then being further arranged to forward the calls to the telephone number associated with the alternate SIM 140 in the body 102. This would be done at a low cost to the new network, since the incumbent network would need to handle, in any event, incoming calls to the user at no charge.

The processor 154 at the gateway 116 can further detect when a network orientated message (including but now limited to, an SMS message or a USSD message) has arrived on the user's default number associated with the default SIM 108. In such a case, the processor 154 will read the network orientated message, store the message in a database 158, and then send the message to the user's new number at a designated "message sending" time.

A similar process happens in reverse when the user places an outgoing call using his mobile station, thereby ensuring that outgoing calls always take place on the new network, so as to take advantage of the relatively local call rates associated with the new network.

It is envisaged that the SIM card devices 70, 100 may be encapsulated within a case, which in turn may be fitted to the mobile device.

Figure 7:
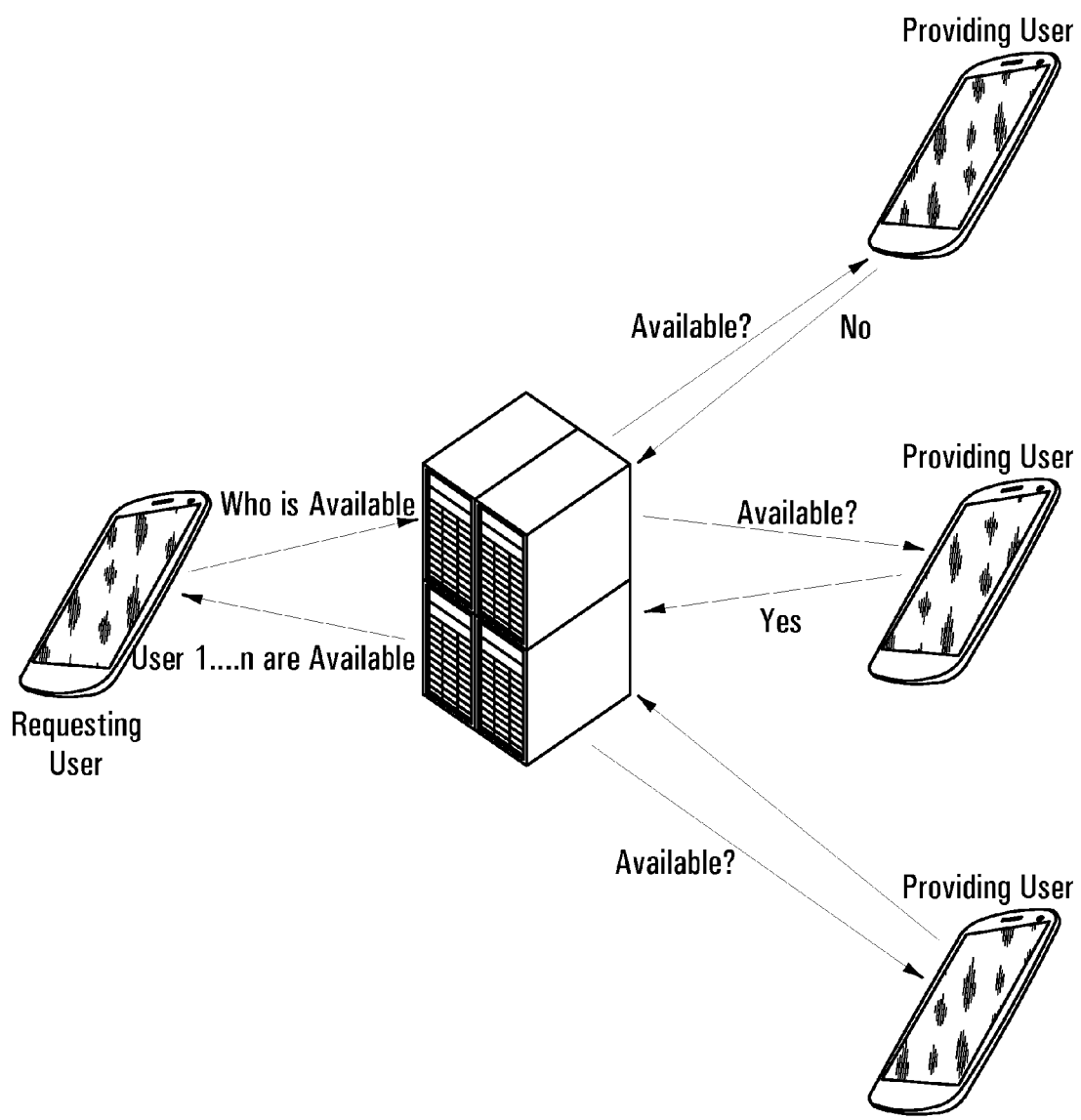
FIG. 7 shows a logic flow between a requesting user and a plurality of providing users.

In use, and with particular reference to FIG. 7, the device 100 will begin in an "offline mode". While in this mode, the user will connect to the mobile network based on the identification credentials of the default SIM in the SIM holder slot 106. When it is determined that the user needs to swap to another SIM ("the requesting user"), the software application contacts the registration server of the remote gateway to determine what SIM cards are available ("the verification procedure"). In order to accomplish this, the registration server sends a communication over IP (or any other means of wireless/wired communication) with all users recorded in its server ("the providing user"). During this communication it checks whether:
 (1) the registered SIM is active;
 (2) the providing user's SIM is still enabled for sharing.

The requesting user will then receive a list of all providing users whose SIM cards are available. In the event that the user does not have access to a data connection, the transceiver module 114 in FIG. 5 could be used to facilitate the communication.

Upon the verification procedure being completed, the mobile device will enter into a "Swap mode" when the user selects which SIM card they wish to connect to. In this mode, the methodology will conduct the following steps:
 1. The software application will contact the registration server to obtain the authentication credentials of the providing user's SIM (IMSI, ICCID etc).
 2. Once the credentials are received, the receiving user's module will utilize its alternate SIM emulation hardware in place of the default SIM inserted in its SIM-holder slot. It should be noted that this step is not necessary, and the module could be designed to allow the user to simply use their inserted SIM card.
 3. The receiving user will log onto the providing user's SIM following the procedure.

Thus, and now with reference to FIG. 5, when the user is in a location where the MNC/MCC is that of the provider of the default SIM 108 and it is determined by the mobile station that the user is not roaming, the device 100 remains in an "inactive mode". In the inactive mode the default SIM 108 remains connected to the default/home mobile network.

MNC/MCC refers to the mobile network code and mobile country code. These two numbers form a unique number for every single operator in the world. For instance, MTN South Africa is 655010, comprising an MCC number of 655 (South Africa) and MNC number of 010 (MTN). Cell C South Africa, on the other hand, is 655007. The combination of the MNC/MCC and roaming is important. It is possible, for example, to have an MNC/MCC that differs from that of SIM 104, but in which the mobile station is not roaming, due to, for instance, agreements or in the US, for example, where going from state to state does not amount to roaming. At the same time, it may be possible to have the same MNC/MCC, but be roaming. This occurs, for example, in Canada where just leaving Toronto amounts to roaming. This embodiment of the present invention is primarily aimed at switching people when they are in roaming territory.

When the device 100 detects that either: (1) the user MNC/MCC has changed and that they are roaming; or (2) the user's MNC/MCC has not changed but the user is nonetheless roaming, the device 100 enters into "active mode". In scenario 1), one way of detecting an MNC/MCC change is by examining the location update information (LOCI) that is sent by the baseband processor (although the baseband processor is not shown in FIG. 3, the device 100 would similarly be positioned between the baseband processor and the default SIM (as with the layout in FIG. 2). The MNC/MCC of the user may readily be extracted from LOCI updates, as long as the baseband processor is able to connect to some network. In order to detect if a mobile station is roaming, the easiest way of accomplishing this is through querying the baseband processor of the phone for its status.

When in the "active mode" the device 100 first ensures that the default SIM 108's credentials have been transferred to the gateway 116. If they have not, device 100 utilizes the second communications module 114 to do this (as described above). Once the default SIM 108's credentials have been transferred to gateway 116, the default SIM 108 is disconnected from the mobile network. One way of achieving this is for the processing component 110 (FIG. 5) to inhibit any communication from reaching the SIM 108. This may, in turn, be achieved by providing a multiplexer (internal or external), wherein when the multiplexer is set to 1 all data to the baseband goes to SIM 108, and when it is set to 0 all data to the baseband goes to SIM 104.

Upon SIM 108 being disconnected, processing component 110 connects the alternate SIM 104 to the mobile station's telecommunications circuitry. In other words, the processor 110 has blocked SIM 108 from talking to the baseband processor, and now all communications are done with SIM 104.

Processing component 116 (FIG. 5) then issues a command to the mobile station's telecommunications circuitry causing the mobile station to reinitialize itself with the credentials of alternate SIM 104, using a so-called "rebootless reset" in which the mobile station restarts its baseband processor without the user physically having to power cycle the mobile station. Alternatively, the same result can be achieved by the user physically restarting their mobile station.

Although not shown, the system 150 may comprise a VOIP server that simply forwards the received calls and SMSs to the user's local SIM.

For clarification, the SIM swap mechanism described above with reference to FIG. 7 shows one of two possible ways. In particular, this figure shows a variety of users (i.e. individuals) who may set up their own devices to allow for loaning of their cards. For example, John is in the European Office and does not need his Canadian SIM, while Joanne is coming from the Asian Office and needs a Canadian SIM for her duration. In this situation, the user would likely have a dual-SIM phone device and/or this device would allow for multiple SIM slots. When a user "rents" a SIM 1 without renting out their own SIM 2 (i.e. they take but do not give), they are placed on SIM 1's network and all their calls/SMSs from SIM 2 are sent to them.

If, however, they rent a SIM 1 and rent out their SIM 2, the forwarding is no longer possible as someone else is using their credentials at the time. Thus, in an alternate variation of the SIM swap mechanism, it is possible that instead of users, an infrastructure is setup with mobile stations and SIM cards (similar to SIM Bank 7 in FIG. 2, in which, for example, there is a room filled with servers that are connected to a mobile network). In this case, the infrastructure emulates many users with many SIM cards that can be rented. Thus, using the above scenario, Joanne coming from the Asian Office would rent out a Canadian SIM not from John but from the infrastructure setup. In this case, the "providing user" is not a real person but a machine. This can expanded upon in which, for example, a requesting user requests from a machine who then requests from another machine who can then request from a real user.

Figure 8:
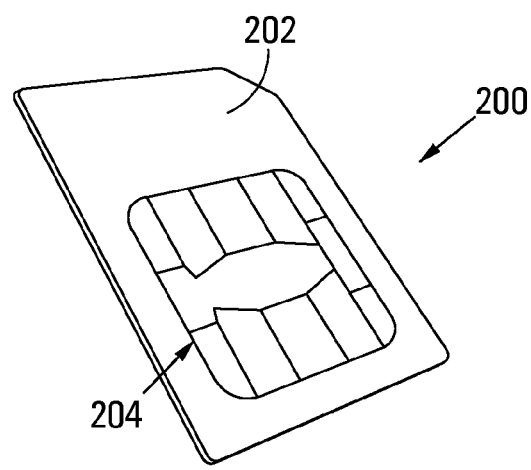
FIG. 8 shows the traditional design of a smart/SIM card.

Turning now to FIG. 8, the traditional design of a smart/SIM card 200 consists of a layer of plastic 202 with a processor (that helps define the SIM) embedded inside. Access to the processor is only possible by utilizing a series of metal pads 204 ("the pads", "external pads" or "communication pads") that are located on the outside of the plastic 202. These pads 204 allow external devices to provide the smart card 200 with power, a clock, and an access point for bidirectional communication. The metallic pads 204 on the SIM card 200 are pressed against similar pads found on the target device. Such a design is limiting as it inhibits the ability of other devices to simultaneously communicate with the SIM. Unless complicated and bulky wiring mechanisms are used, the SIM card 200 must be physically moved in order to be used with multiple devices.

In an embodiment of the present invention, a wireless communication module ("the WCM") is provided on the SIM card 200 so as to define a "Wireless SIM" that can communicate with multiple external/attached devices over wireless mediums. It should be noted, that the "Wireless SIM" will not prevent or hinder the ability of the SIM card 200 to utilize a wired medium for communicating with external devices. It should also be further noted that while the term "Wireless SIM" is used, this does not restrict the technology to SIM/smart cards used within mobile devices. As the smart card technology is a generic protocol, the technology can be used in conjunction with smart cards embedded in bank/credit cards, washing machines and other such devices.

The Wireless SIM can exist in one of two forms. In its first form ("the attachment form"), the Wireless SIM is an "external module" that latches onto an existing SIM card, such as card 200 in FIG. 8, thus corresponding to an overlay SIM card of the type discussed in more detail further below. The external module contains all components required for data processing and communicating with external devices. In order to communicate with the SIM, the external module directly connects itself to the SIM card's pads. It should be noted that it is not necessary for the external module to be directly placed onto the smart card itself. In one form, the external module could be connected to the smart card through a flexible PCB.

In the second form of the invention, the Wireless SIM is directly embedded onto the SIM card itself. In this form, the components required for processing data, communicating with external devices, and SIM-card related functionalities are contained within one system ("single system form"). It should be noted, that in the single system form it is not necessary for an actual smart card processor to be present. It is possible for all SIM-related functionalities to be simulated by the components responsible for data processing (i.e. a "virtual" SIM). Similarly, it is also not necessary for a data processing component to be present. Instead, all data-processing functionalities could be embedded on the smart card processor.

In one embodiment of the Wireless SIM, an embedded bluetooth radio is used to communicate over the wireless medium whereas the Virtual SIM resides on a separate computer. The Wireless SIM in this embodiment would serve as a "pipe" between the mobile phone and computer. All communication coming from the mobile phone's baseband would be captured by the wireless SIM and then retransmitted to the computer over bluetooth. The computer running the Virtual SIM would then determine the appropriate response and relay this information back to the Wireless SIM (which in turn would transmit it back to the baseband).

Regardless of what form the Wireless SIM takes, it may contain one or more of the following components:
1. Wireless Communication Module ("WCM"): a device capable of communicating with other devices over a wireless medium. The type of wireless medium is not restricted to any protocol in particular. Instead it could be (but is not limited to) Bluetooth, WIFI, GSM/3G/4G and any others that currently exist or may be created in the future.
2. Smart Card Processor ("SMP"): a processor (or similar device such as a microcontroller) that is used to facilitate normal smart card functionalities. These include, but are not limited to, data storage (authentication vectors, contacts etc.), authentication to a network, and basic communication (such as reading and writing). If the SMP is merged with the data processing module, it is not necessary for this to be a separate component.
3. Data Processing Module ("DPM"): a processor, microcontroller or similar devices used for managing data communication between the SMP and the WCM. The DPM functionalities include, but are not limited to, parsing and replying to requests from the WCM and transferring data to the SMP.
4. Wiring System: As the wireless SIM can exist in an attachment form, the wiring system is a means by which the external module can be connected to the SIM card itself. It should be noted that this is not limited to simple to wires connecting the external module to the SIM card's pads. It could also consist of a system whereby the pads of the external module are pressed against the SIM card's pads.

In use, the Wireless SIM will operate autonomously and create an access point ("AP") that external devices can access it from. This access point will depend on the technology used, but could be anything from a WIFI hotspot to a TCP socket. Any communication that comes through the AP will be processed by the DPM and forwarded to the SMP. At the same time, any responses from the SMP will be processed by the DPM and forwarded to the device via the AP. It should be noted that there is no limit placed on how many devices can connect to the Wireless SIM at any given time. The limit, if any, will be dictated by the wireless communication protocol used.

Thus, in one version of the invention, the SIM card device/module, and in particular, the WCM, may be used purely for data transfer from the default/home network to the new/alternate network. This is all done using the virtual SIM concept described above, with, again, the aim being to provide the user with the best available data rates in an automated and seamless manner. In this version, however, there would be no mobile station as such, but would rather take the form of a simple hardware encapsulating the SIM card device/module, such as a USB or a MiFi module.

In an embodiment the MiFi/USB module consists of a processor, a wireless/wired communications module, telecommunications modems (2G, 3G, LTE etc) and a SIM Bank server. The processor contains an embedded virtual SIM that interfaces with the telecommunications modem. The credentials of this virtual SIM are obtained from SIM cards stored in a SIM Bank Server through the wireless/wired communications module.

Turning now to FIGS. 9 to 14, a SIM card overlay in the form of a PCB device will now be described. In particular, this aspect of the invention relates to an overlay or 'sticker' that attaches to a SIM card, the device being designed, in particular, to allow for the creation of an overlay that is capable of being used with any sized SIM card or within any SIM card holder. The terms USIM card and smart card may also be used when referring to 'SIM card'. This part of the invention relates to an overlay that attaches to a SIM card, to provide an overlay that is capable of being used with any sized smart card or within any smart card holder. In order to be able to intercept communication between a SIM card and a mobile station, it is necessary for some hardware to be placed between the mobile station and the SIM card. In an embodiment, this takes the form of an overlay that comprises:
1) A microcontroller, microprocessor or similar used for processing communications (henceforth referred to as the "communications processor").
2) A PCB (flexible or otherwise) upon which the communications processor is mounted and wires are routed.
3) Pads that allow for the communications processor to send/receive information to/from the mobile station or smart card.

In designing such a system, it is critical that the overlay when attached to the SIM card does not exceed the maximum height of the mobile station's smart card holder. The smart card holder consists of a metallic "cage" into which the SIM card is placed and generally restricts the height of whatever is inserted to 0.9-1 mm. Furthermore, with manufactures pushing for the adoption of "nano"-sized SIM cards, the length and width of the smart card holders are becoming increasingly smaller so as to comply with the ever decreasing size of the SIM card.

The aim of this aspect of the present invention is to provide an overlay that is capable of being used with any sized smart card ("the seamless overlay"). The device will conform to any size restrictions imposed by the smart card holder without the need of any external wires. As already described above with reference to FIG. 8, a SIM card usually consists of 3 components:
1) A plastic enclosure (unless it is a nano-SIM).
2) A processor in the form of an IC.
3) Pads/Pins to facilitate communication, with the layout of the pads and how they are connected to the processor being of particular importance.

Figure 9:
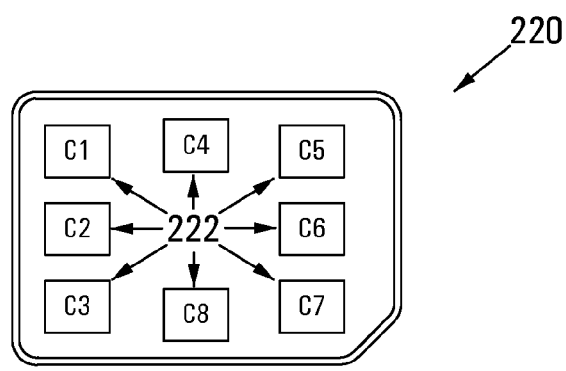
FIG. 9 shows connecting pads on a traditional smart/SIM card.
Figure 9:
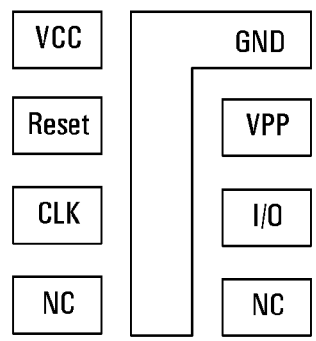

As shown in FIG. 9, the SIM card 220 can have upwards to 8 pins/pads 222 and the processor is usually placed in such a fashion so as to minimize the length of wire (or trace) needed to reach the pads. Of all the pads 222 that are available, however, VPP (pad C6) is never connected in the final SIM card 220 that is distributed to customers. VPP is used for programming the processor chip, and this is done only once in the factory prior to connecting the processor to the pads. The pad remains there to allow for non-mobile stations that utilize smart card technology to connect and utilize the pin should they find it necessary. It should be noted that while FIG. 9 shows C6 being placed in the middle-right position, it is possible that future revisions of the SIM change the location of this pad.

In developing a seamless overlay, the invention takes advantage of the fact that C6 is not used in mobile station and is generally left unconnected. This aspect of the invention thus comprises two components:
1) A thin overlay with an embedded communications processor, with two possible versions being shown in FIGS. 10 and 11.
2) A tool capable of accurately removing C6 ("the VPP removal tool"), which will be described with reference to FIG. 11.

Figure 10:
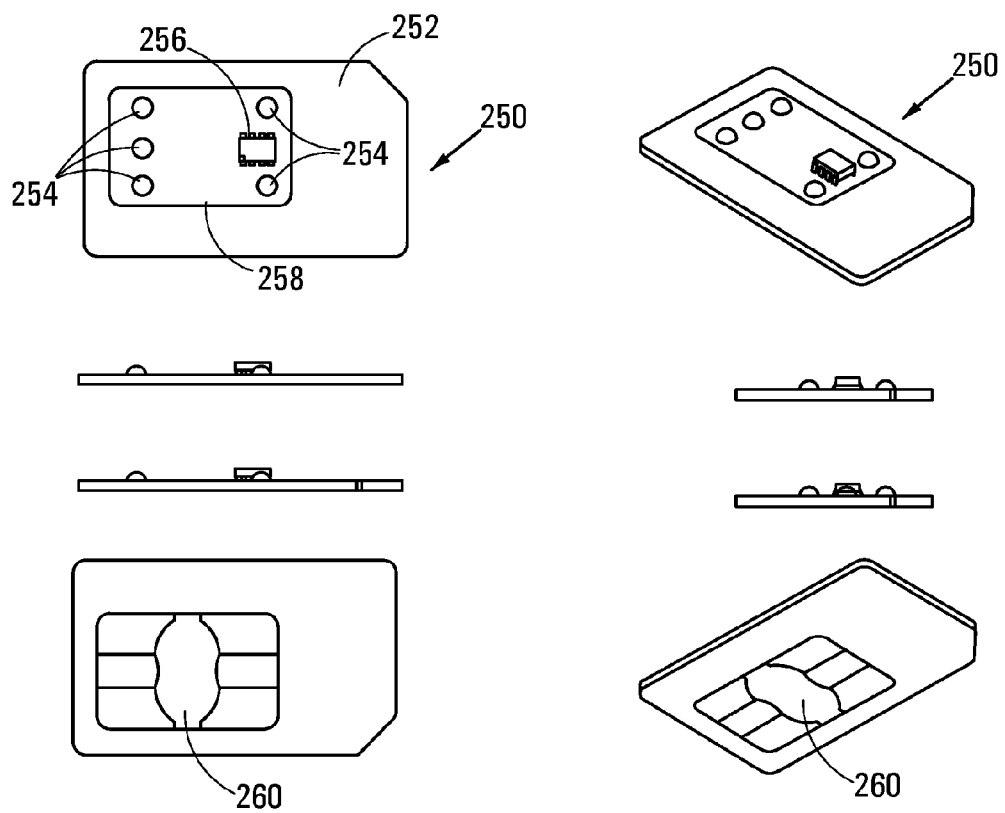
FIGS. 10 and 11 show two versions of a thin overlay with an embedded communications processor, according to further embodiments of the present invention.

Referring to FIG. 10, a device 250 for use as an overlay that attaches to a SIM card, such as card 220 in FIG. 9, within a mobile station (MS), typically a cellular/mobile telephone, is shown. The device 250 comprises a body 252 having six SIM-communication pads 254 and a communications processor 256 embedded therein. The six SIM-communication pads 254 are used to allow for the communications processor 256 to be able to send/receive information to/from the attached SIM card 220. Ideally, and turning back to FIG. 10, the communications processor 256 should have a length of no greater than the distance between the upper edge of C7 and the lower edge of C5 and a width less than or equal to the distance from the left edge of C6 to the right most edge of the SIM card itself.

Furthermore, the communications processor 256 should be placed such that when the device 250 is pressed again the communication pads of the user's SIM 220, communications processor 256 presses against contact C6. Pads 254 and processor 256 are mounted on a thin PCB 258 that may be in the form of a flexible PCB or something of similar thickness. Depending on the thickness of the PCB, it is possible that part of the communications processor 256 is submerged into the PCB 258 itself in order to save on height. The thickness of thin PCB 258 should be such that it does not exceed the thickness of the user's SIM card 220.

The device 250 further comprises, on the back of the device 250, external communications pads 260. Pads 260 allow for the device 250 to communicate with any external devices (such as the mobile station).

Figure 11:
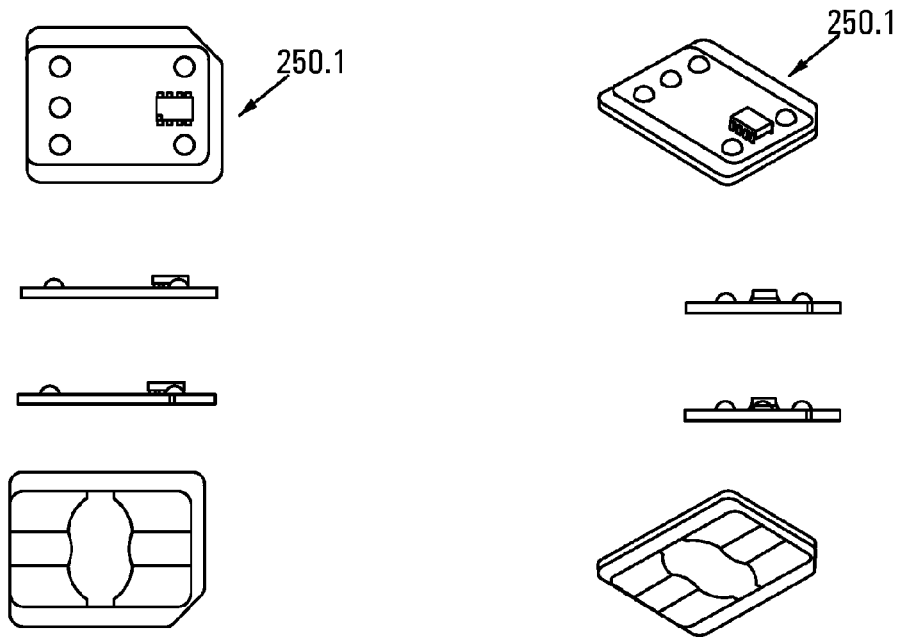

Furthermore, as shown below in FIG. 11, it is not necessary for there to be a plastic frame at all. How much of a plastic frame exists will depend on the form (mini, micro or nano) of the user's SIM. The overlay 250.1 in FIG. 11 is substantially the same as the overlay 250 in FIG. 10 save for this difference, and thus will not be described in more detail.

Figure 12:
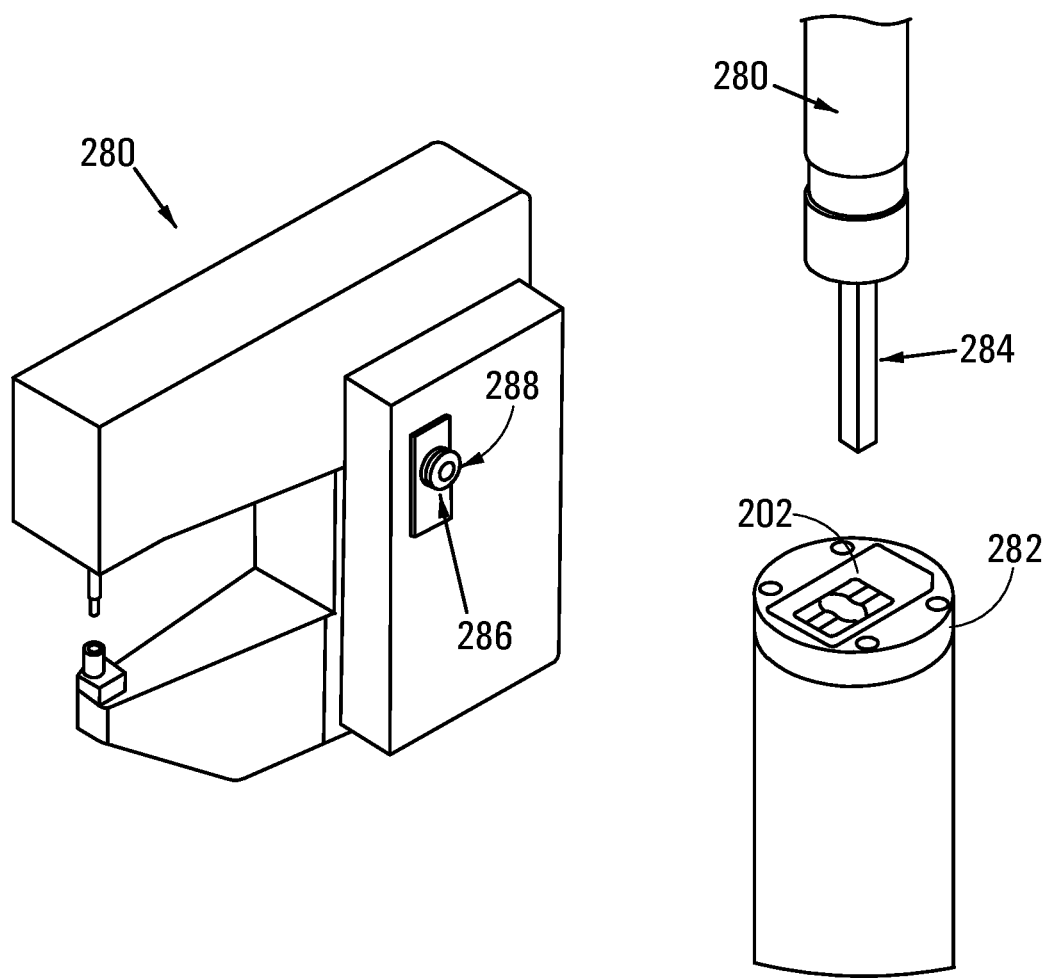
FIG. 12 shows a VPP-removal tool to modify a user's existing SIM card.

Prior to the overlay 250 being attached to the smart card, a VPP-removal tool may be used to modify the user's existing SIM card. As depicted in FIG. 12, the tool 280 consists of an alignment system 282 and a hole punching mechanism 284. The alignment system 282 allows for the users to line up the punching mechanism 284 with the VPP (Contact C6) of their SIM card. The user, an embedded processor 286, or both, adjust/s the knob 288 in order to align the hole punching mechanism with the VPP contact.

Figure 13:
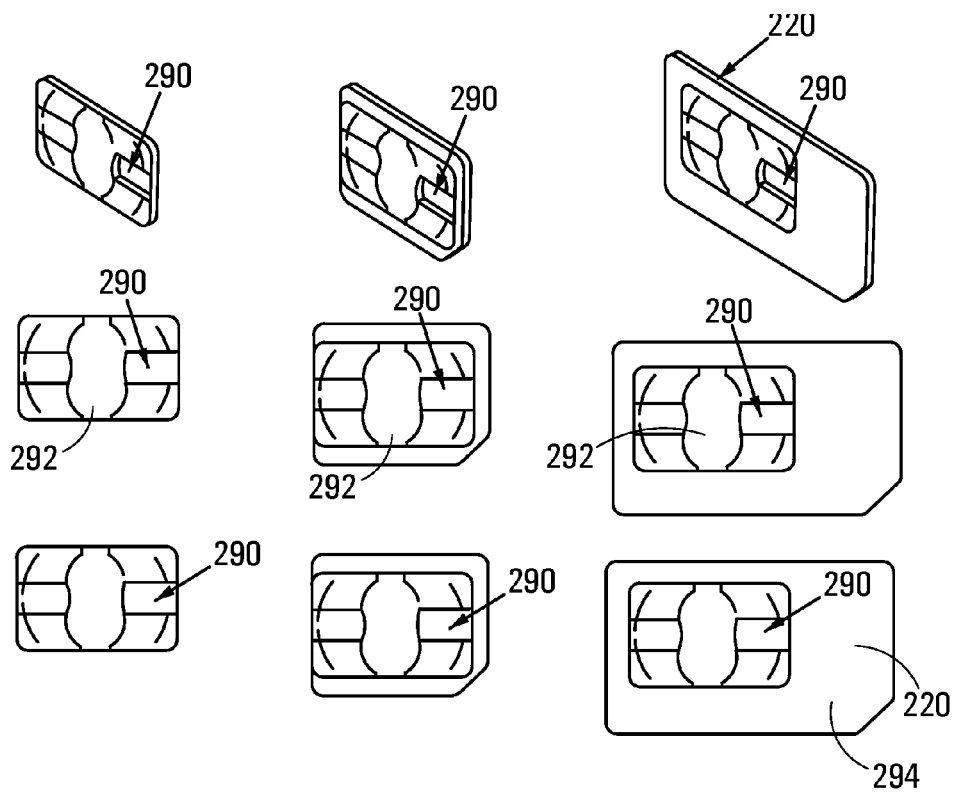
FIG. 13 shows a SIM card after the VPP has been removed.

Once the alignment system 282 has located the VPP, a hole 290, as shown in FIG. 13, is punched of a size to accommodate the communications processor 256 in device 250 (FIG. 10). It should be noted that the hole 290 is not limited to simply the contact portion 292 of the SIM card 220. Instead it can extend into the plastic frame 294 (should a plastic frame exist).

Figure 14:
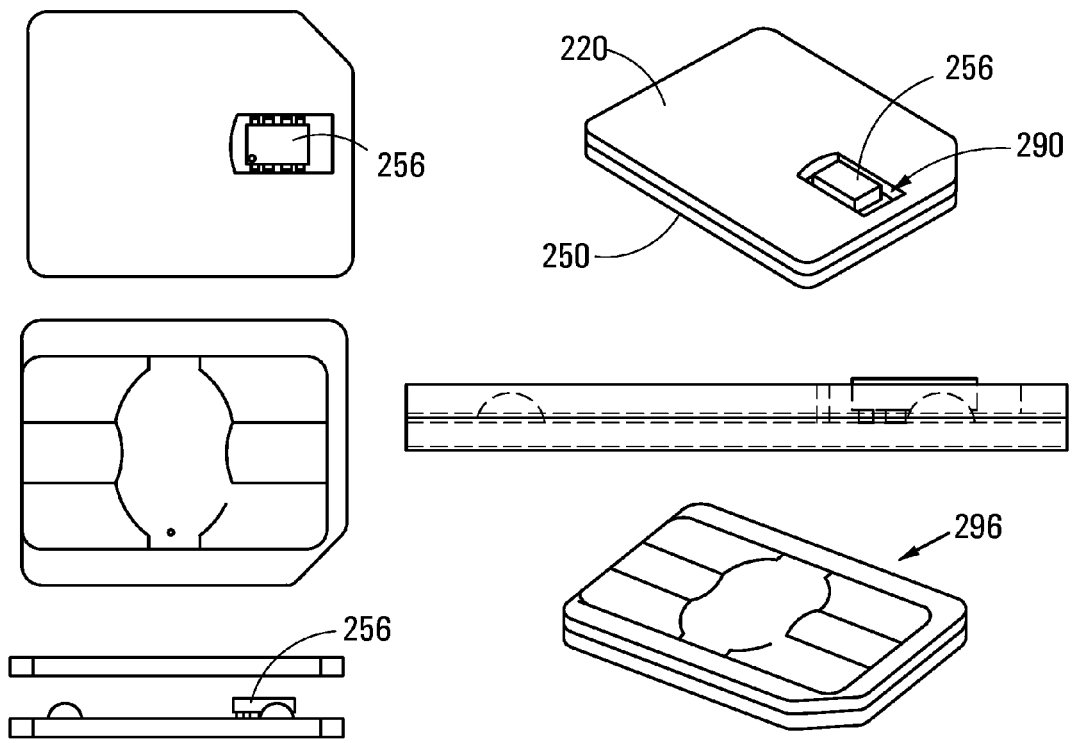
FIG. 14 shows a combined overlay and SIM card.

Once the hole 290 in FIG. 13 is created, as shown in FIG. 14, the overlay 250 is placed onto the user's SIM 220 in a manner that the communications processor 256 fits through the hole 290. The placement of the overlay 14 should be such that the user's SIM 220 and overlay 250 line up exactly. When this is accomplished, the resulting SIM card composite 296 will be able to fit into a mobile station's smart card holder regardless of size requirements.

In an alternate embodiment, it is not necessary for the VPP of the SIM card to be punched. The passive and active components that make up the overlay are thinned such that the total thickness of the overlay does not exceed the tolerance requirements of a SIM card. The components are then assembled in such a manner so as to ensure that the total surface area of the overlay does not exceed that of a NANO SIM card. This consequently allows for a "one size fits all" solution.

Alternatively, the overlay 250 may be incorporated into the cage or tray for holding the default/home SIM.

Figure 15:
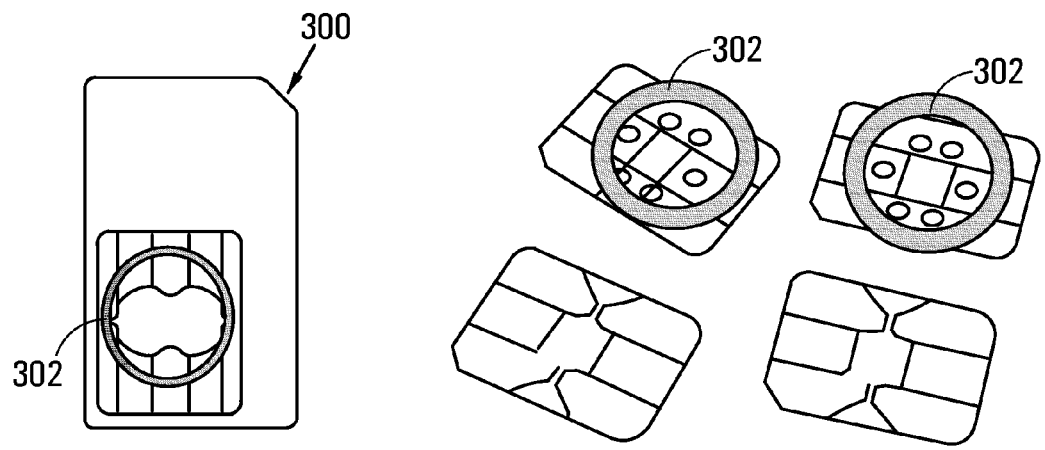
FIGS. 15 and 16 show a SIM card overlay in the form of an electronic chip on a board.
Figure 16:
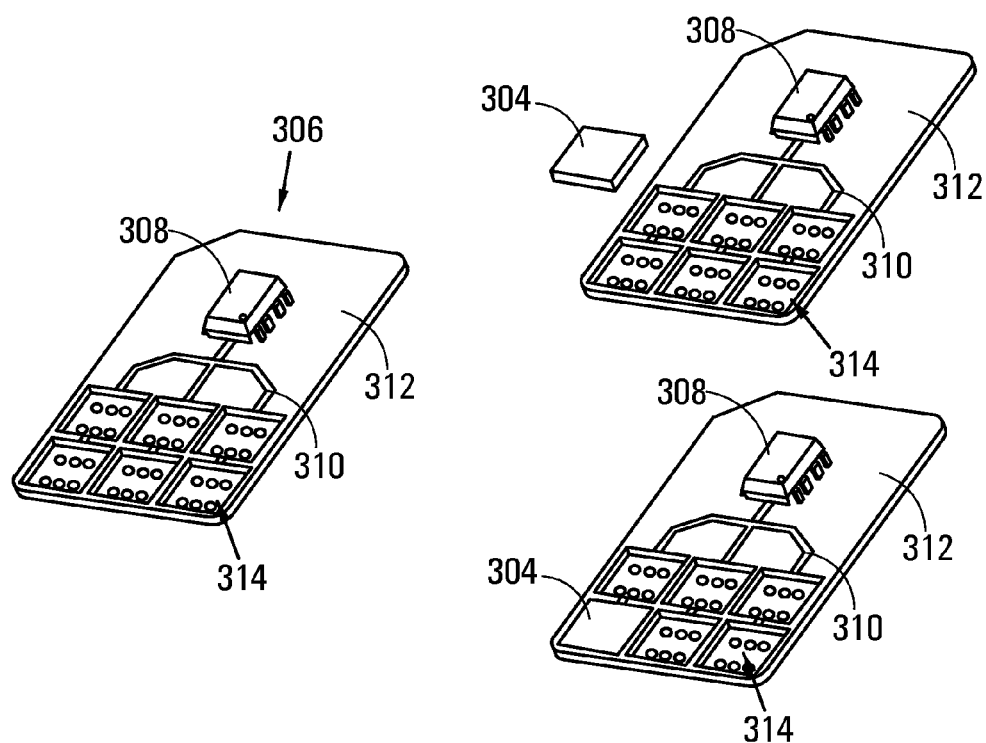

Turning now to FIGS. 15 and 16, a SIM card overlay in the form of an electronic chip on a board will now be described. In developing a seamless overlay, this aspect of the invention takes advantage of the fact that the majority of a SIM card 300 is logically or electrically insignificant. As shown by the circled areas 302 in FIG. 15, only a portion of the SIM card 300 is necessary, with this portion being referred to further below as the 'SIM [Card] IC'. A tool, similar to tool 280 in FIG. 12, may be used to punch out the 'SIM IC' so as to define a Cutout SIM 304 as depicted in FIG. 16.

Once a Cutout SIM 304 has been created, it is placed into a SIM Overlay 306 that consists of a communication chip 308, routing wires 310, PCB Board 312 and Cutout SIM Holders 314. The back of the SIM overlay 306 looks identical to a normal SIM card, with connection pads capable of communicating with a mobile station's connectors. As depicted in FIG. 16, the number of Cutout SIM Holders 314 could be more than one, with the maximum amount of Cutout SIM Holders 314 that can be present on the SIM Overlay 306 being restricted by the surface area of a smart card.

Communication chip 308 is used to process all communication between the mobile station and the Cutout SIMs 304 present in Cutout SIM holder 314. This includes extracting authentication credentials, swapping between Cutout SIMs and transferring information to remote servers. Communication between communication chip 308 and Cutout SIM Holders 314 take place via routing wires 310. The technology for the routing wires 310 is not limited to physical wires, but could also be copper traces etched into the board.

One application of the present invention is the ability to conduct mobile network connection transfers utilizing the above technology. As is well known, and partly described above, upon registering with a network, users are provided with a USIM (Universal Subscriber Identity Module) card (or a SIM card for networks using older technologies). Within this card is stored a set of identification information that allows a user to "unlock" access to a networks towers. This information is unique to the user and includes:

1. IMSI, ICCID, Ki and Kc, which have all been described above.
2. Authentication-related vectors: these vectors are found in USIMs and are used to safeguard the user against "dummy towers" being set up to steal their SIM's identification credentials. The vectors allow the users USIM card to verify that the tower it is connecting to is that of the mobile operators and not a malicious user's.
3. TMSI/P-TMSI: special vectors that are used by the mobile network to track where the user is located.

In allowing users to access their networks, mobile operators generally utilize one of two processes, namely either "Full Authentication" or "TSMI Authentication". The "Full Authentication" process is the standard by which a network authenticates a user to the network. Upon turning on their mobile station, the user's device determines which network the SIM card belongs to and broadcasts its IMSI in an effort to gain access to the network's mobile services. Upon reading the user's IMSI, the network obtains the users authentication credentials from its servers and transmits a series of "RANDs" to the SIM card. If the SIM card is able to provide accurate responses for each RAND, the network grants the user access to its networks. All communication then proceeds using the encryption keys generated by the SIM during authentication. The problem with the "Full Authentication" system is that it is relatively slow and exposes the users to the risk of "dummy towers" stealing its credentials. This is because, until the authentication is completed, communications between the USIM and networks occur unencrypted. Thus, if the user were to have to re-authenticate every-time they lost connection/restarted their mobile station, this would expose them to the risk of over-the-air SIM-card identity theft.

In order to minimize this risk, on gaining such access, the user's SIM is programmed over-the-air (OTA) with "TMSI" (voice) and "P-TMSI" (data) numbers. These numbers store information regarding the user's location/network connection and serve as a means by which the user can identify themselves to the network without having to under-go a "Full Authentication" (the "TMSI Authentication" process). The TMSI/P-TMSI are generally valid from the earlier of 12-48 hrs from the last Full-Authentication or when the user enters a region deemed to be a "new location" by the network.

The part of the invention, in this regard, will be referred to as the "Connection Transfer System" or "CTS". CTS intends to take advantage of "TMSI Authentication" to provide users with a means by which they can connect to different networks despite not being physically in possession of the SIM cards. Upon enabling the CTS system, the user would select a network to which they would like to connect to. The available networks would be based on USIMs/SIMs that were stored either in a remote server or a module connected to their mobile station (hereinafter referred to as "the remote SIM(s)"). Once selected, a communication module on a remote server (or attached to the user's mobile device) would conduct a "Full Authentication" in order to generate a valid TMSI/P-TMSI sequence. These sequences would be then passed to the user's CTS system. This would enable the user to connect to the network that the remote SIM was registered to (without physically having to be in possession of the SIM or inserting it into their mobile device).

CTS comprises three general components:
(1) SIM Virtualization Hardware (i.e. the SIM device as described above).
(2) A "SIM Storage Module" that encompasses a system that stores remote SIMs cards and is capable of writing and reading data to them, contains a communication device that allows it to connect to mobile network operators ("network communication device"), and contains a communication device that allows the module to transfer data to the SIM Virtualization hardware by wired or wireless means. The implementation of a SIM Storage module is not to be limited to a server connected to a SIM Bank. It could also take other forms, such as a case that attaches to the users mobile station or a wireless device that the user carries with them. Furthermore, the "SIM Storage Module" need not be a single self-contained system, but could be comprised of separate sub-modules connected by wireless or wired means.
(3) A software application that runs on the user's mobile device, SIM card or on the SIM virtualization hardware itself. The software application could also consist of software running on a microcontroller embedded in the CTS system.

In use, CTS begins in an "offline" mode. When in this mode, the user will connect to the default/home network specified by the SIM Card inserted in their mobile device. When CTS is enabled, the software application communicates with the SIM Storage Module to determine what networks are available based on the remote SIM cards stored in the module. From this query, the user is presented a list of networks to whom they can connect to.

When a network is selected by the user, CTS enters "transfer preparation mode". Upon entering this mode, the software application informs the SIM Storage Module to prepare the selected SIM for a connection transfer. This involves the following steps:

1. Upon being informed that "transfer preparation mode" was triggered, the SIM Storage module erases all information concerning previous authentications on the selected SIM card. This will ensure that the network is forced to generate "fresh" TMSI/P-TMSI sequences.
2. The module powers on the network communication device and connects the selected SIM card to it.
3. The network communication devices engages the mobile network operator to begin an authentication sequence based on the identification credentials of the selected SIM Card.
4. Once the TMSI/P-TMSI values are generated, the SIM Storage Module shuts down the network communication device. The shut-down procedure should be done during the transfer preparation mode so as to prevent the possibility of two different devices connecting to the network simultaneously. Two devices being simultaneously connected could result in TMSI/P-TMSI sequences being invalidated or a card being banned from the network.
5. After the network communication device is shut-down, the SIM Storage Module reads the TMSI/P-TMSI sequences from the card and transfers them to the software application. In addition, the SIM Storage Module will transmit the remote SIM card's identification credentials.

Upon receiving the TMSI/P-TMSI, CTS enters into "transfer mode". During this mode of operation, the connection transfer is completed through the following steps:
1. The software application takes the TMSI/P-TMSI sequence and transfers it to the SIM Virtualization Hardware. This can be accomplished via external wire/wireless communication modules or by utilizing the mobile device's internal communication channels.
2. Once the TSMI/P-TMSI and identification credentials are received, the SIM Virtualization Hardware enters into "listening mode". While in this mode, the hardware will intercept any requests by mobile device for TMSI/P-TMSI/identification credentials of the inserted SIM. The hardware will remain in this mode until the user disables the CTS system.
3. Upon the Sim Virtualization Hardware entering "listening mode".

A SIM session reset will be triggered by one of two methods:
1. The user will manually restart their mobile station.
2. The hardware will request that the baseband perform a warm reset via STK, CAT, or similar technologies. A warm reset will force the baseband to reread all the data on the SIM card.

Once the SIM session reset is complete, the hardware will respond to any requests for TMSI/P-TMSI/identification credentials with values transmitted from the SIM Storage Module.

Once the process is complete, the user will be connected to the mobile network operator that they selected.

In a further application of the present invention, a method of Contract Load Balancing using the above virtual SIM technology will now be described. For the purpose of this section, 'Contract Load Balancing' will be referred to as the "CLB System". The CLB system is comprised of three general components:
1. SIM virtualization hardware.
2. A server that has a SIM Bank server attached to or built into it ("SIM Bank Server"). This component of the CLB system keeps record of persons who are registered as part of the system, a list of SIM cards that are present in the SIM Bank server, and information on the plans that are tied to each SIM Card ("the cellular plan").
3. A software application that runs on the user's mobile device or the SIM card itself.

When the CLB System is enabled, the software application enters into the "monitoring" phase. Upon entering this phase, a connection with the server is established over an existing WIFI connection or by utilizing a data connection provided by the mobile network provider (such as 3G or other). The application then obtains from the server the cellular plan information of the SIM card that is currently in use. While in the "monitoring" phase, the application records the user's airtime/data/SMS usage (the "usage statistics") and verifies that the user has not exceeded their cellular plan limits.

The "monitoring" phase will continue until an "excess event" has been triggered. An "excess event" occurs when the system detects that:
1. The user has exceeded the allowable usage designated by their cellular plan or is about to exceed their plan (as determined by a pre-defined threshold); and
2. One of the following occurs:
    a. The user is making a phone call or sending an SMS; or
    b. Data transmissions are occurring over a non-WIFI data connection.

If the "excess event" is triggered by the user making a phone-call/SMS, the software system will intercept the call/SMS. Information on the call/SMS will be saved and the system will then enter the "contract balancing" phase. If, however, the "excess event" is triggered as a result of data usage, the system will automatically enter the "contract balancing" phase.

Upon entering the "contract balancing" phase, a warning will be displayed to inform the user that they have (or are in danger of) exceeding their cellular plan. An option will be presented to the user allowing them to either: (1) proceed under their current plan (and possibly incur additional charges) or (2) allow the system to dynamically swap them to a new plan. If the second option is selected, the software application will communicate with the SIM Bank server to provide the user with the credentials of a different SIM. The communication will occur over an existing WIFI/data connection or through a communication device attached to the SIM virtualization hardware. The plan-swapping will be done through the following steps:
1) The software application will transmit the user's cellular usage statistics to the SIM Bank Server.
2) Based on the usage statistics, the SIM Bank server will examine the SIMs it has available and select one that best suites the user's usage requirements. For instance, if the user is almost out of data, a SIM will be found that has available data usage on its cellular plan. If the user's usage statistics show that they only lightly use data, a SIM will be provided that has a smaller data plan to allow for larger data plans to be allocated to users with greater data needs.
3) Upon a plan being selected, the server will communicate back to the software system the identification credentials (IMSI, ICCID, PLMN and any other credentials required to identify the SIM to the network). With the SIM Bank server, the SIM will be designated as "in use" to prevent the possibility of it being allocated to another user.
4) The software system will pass the identification credentials via a communication protocol (Bluetooth, USB or any other wired/wireless method of communicating) to the SIM Virtualization Hardware.
5) The software system will then initiate a "session reset" process to allow for the new SIM credentials to be authenticated. This process may be identical to that used by the SIM Virtualization hardware to perform a SIM-swap. Furthermore, this process may be conducted by way of a "cold reset" (physically restarting the mobile device) or a "warm reset" (restarting the mobile network session without turning off the mobile station).

Upon the new SIM credentials being authenticated, the software system will then enter the "functionality resuming" phase. If the original "excess event" was triggered by a phone call/SMS, the system will redial the phone number/send out the original SMS. If, however, the excess event was triggered by data usage, the system will skip this phase entirely.

It is important to note the solution of the present invention may be done either with or without the cooperation of the various communications networks. In the independent scenario (i.e. without network co operation), as described above, a VOIP server is used to simply forwards the received calls and SMSs to the user's local SIM. However, in the network dependent scenario, and with reference to FIG. 10, the communications processor 256 allows a multitude of IMSI-related confidential information (such as the IMSI itself, the Ki and the related algorithm) to be stored in on the SIM card device 250 itself, so as to define a multi-IMSI SIM card device 250. It is envisaged that up to 600 IMSIs may be stored on the device 250.

MVNOs have been briefly described above, but it is important to note that MNVOs have increased in prominence in recent years. In one version of the invention, it is envisaged that the confidential network credentials of all SIM cards used by the MVNO (MNOs even) be stored on the SIM card devices (of the present invention) described above. In such a case, when monitoring the communications between the SIM card and the baseband processor, as described above, the solution of the present invention will provide a SIM card profile to ensure the best possible local rates for the user. In this arrangement, it may be said that the SIM card associated with the default/home communications network cooperates with the SIM card device 250 of the present invention, in any of the embodiments shown in FIGS. 4, 5, 10, 11, and 13 to 16.

In this regard, an accounts module may be provided to control and manage the billing of users using the solution of the present invention. In particular, it is envisaged that either there will be one account for all MVNOs/MNOs (in the form of, for example, a central wallet) or multiple accounts (one per MVNO/MNO). Thus, when a switch to a new/alternate/optimum network takes place, as discussed above, the solution sets up a call forward to the local country number and linked using VOIP to an active SIM card in that country, thereby ensuring the best possible rates for the user.

Advantageously, required updates for the present invention may be made over the air (OTA), in any one of a number of different ways, such as SMS, USSD etc. Typically, the network updates items such as who the user is not allowed to connect to (FPLMN), files dealing with steering the user to preferred networks, phone number updates, emergency number updates and even the user's IMSI credential.

Figure 17:
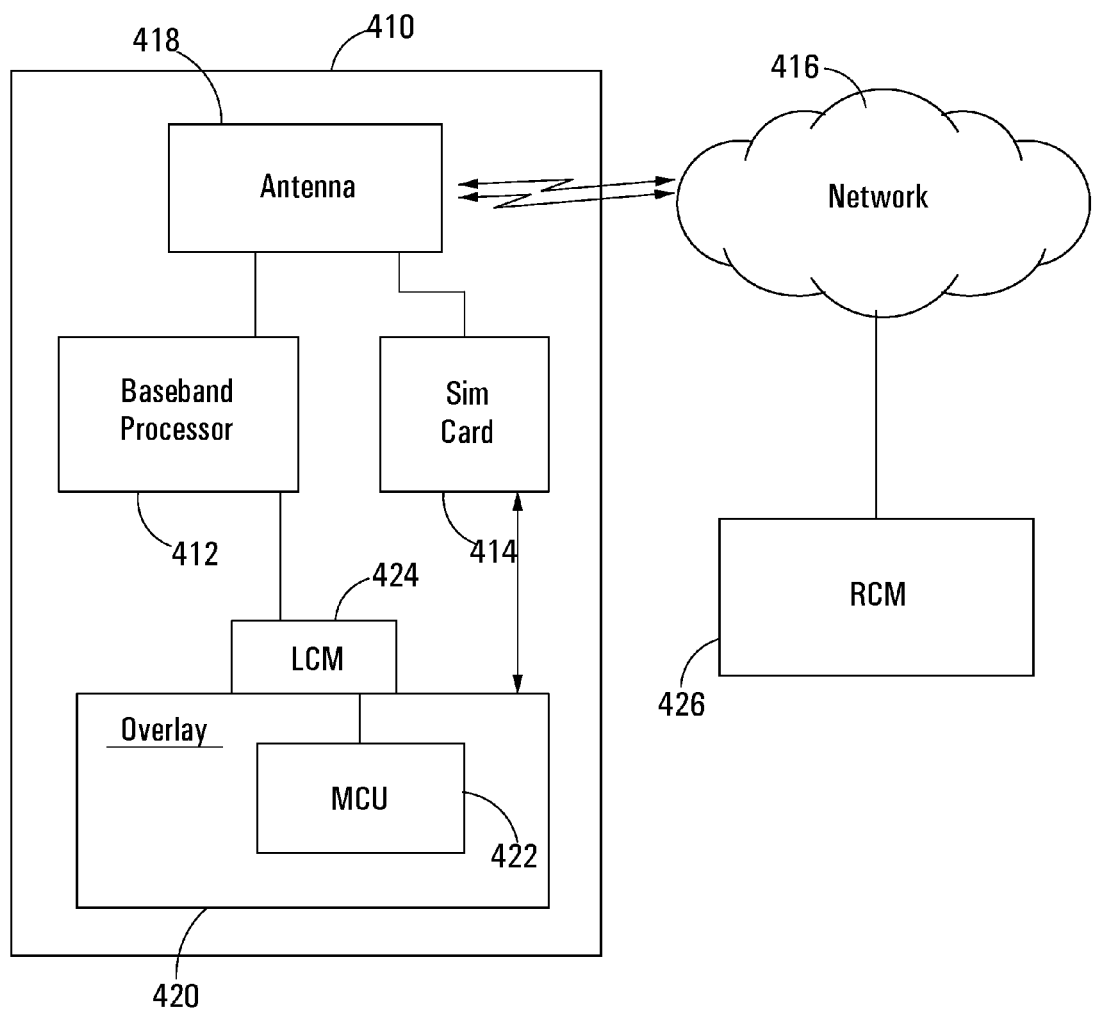
FIG. 17 shows an arrangement for achieving POTA (Precision Over the Air updating), according to yet a further embodiment.

Regarding OTA updating, in a further embodiment, this invention can perform Precision Over the Air updating (POTA), which will now be described with reference to FIG. 17. As described above, a mobile device 410 typically comprises a baseband processor 412 to manage the antenna-related functions of the mobile device 410 and a SIM card 414, with the baseband processor 412 communicating with a network 416 via an antenna 418. A SIM card device 420, which may take the form of an overlay, is located between the baseband processor 412 and the SIM card 414. The purpose of the overlay 420, as described above, is to intercept communications between the baseband processor 412 and the SIM card 414, and to redirect and modify the communications so as to authenticate the mobile device 410 on an alternate communications network.

As described above, the overlay 420 comprises:
1) A communications processor (or MCU) 422, in which firmware is embedded;
2) A PCB (flexible or otherwise) upon which the MCU 422 is mounted and wires are routed; and
3) Pads that allow for the MCU 422 to send/receive information to/from the mobile device's SIM card 414.

As would be expected, the firmware in the MCU 422 needs to be remotely updated and configured.

In an embodiment, the overlay 420 further includes a local communications manager (LCM) 424 to receive an update message from a remote communications module (RCM) 426 and to issue an appropriate command to update the MCU's firmware accordingly. The LCM 424 may take the form of either a separate chip to intercept the messages sent from the RCM 426 or a module 424 on the overlay's MCU 422 (as illustrated). In one particular version, the LCM 424 takes the form of a procedural algorithm on the MCU 422. The purpose of the LCM 424 is to read, interpret and process messages sent from the RCM 426 and then issue the appropriate commands to the MCU 422.

In an embodiment, the MCU 422 comprises a distributed data MCU (DDMCU), in which the MCU 422 comprises a plurality of permanent or pseudo-permanent memory blocks, each memory block governing an instruction or function (or related instructions or functions) associated with the overlay 420. In other words, in utilizing this feature, the overlay's MCU 422 is structured so as to have its data distributed appropriately (a DDMCU). This is achieved by segregating the instructions that are to be loaded on into segregated blocks of memory. Each group of related instructions are grouped into one permanent memory block with additional buffer space allocated to allow for the expansion of the instruction blocks' size. As an example, the memory block dealing with UART communications could be assigned to memory address 0x3000 whereas the memory block dealing with SIM Toolkit Menu control may be placed in memory address 0x4000. The exact addresses used are irrelevant.

In an embodiment, each update message sent by the RCM 426 comprises the address of the memory block in the MCU 422 to be updated and a matching list of replacement data that is to replace the existing data in the respective memory block. In order to conduct an update, the RCM 426 is loaded up with the list of memory addresses that require updating. For each memory address there is a matching list of replacement data, typically in the form of hexadecimal values. These values correspond to the instructions that are to be present in the specified memory location. For example, in location 0x3000 the corresponding list of hexadecimal values could be 0xFF 0xFF 0xFF 0xFF. This would mean that the first 4 bytes starting from 0x3000 would be replaced with the value 0xFF. It should be noted that it is not necessary that the values be in hexadecimal format. Binary or similar could also be used so long as the LCM 424 is configured to interpret the format used correctly.

Once the RCM 426 is loaded with the list of memory addresses that need to be updated, update messages are sent to the overlay 420 utilizing the RCM's selected communication protocol. In one embodiment, this could be through the use of binary SMS. In utilizing binary SMS, the message is appropriately encoded so as to inform the mobile phone 410 in which the overlay 420 resides to pass the message to the overlay 420. This would be achieved by the mobile phone 410 passing the message to the baseband processor 412, which in turn then communicates it over UART to the overlay 420.

In an embodiment, the LCM 424, upon receiving the update message, determines the address of the memory block in the MCU 422 to be updated. Upon the message reaching the overlay 420, the LCM 424 intercepts the message and processes it. Processing will involve determining what memory location the data is to be written to and preparing the system for an update. In preparing the overlay for the update, the LCM 424 is arranged to:
  stall the baseband processor 412 by requesting more processing time (since the updating process can be time intensive);
  instruct the MCU 422 to erase the data at the address in the memory block that is to be updated;
  instruct the MCU 422 to write the replacement data into the address of the memory block; and
  once the replacement data has been written into the relevant memory block, instruct the baseband processor 412 to return to normal operating state.

In an embodiment, if the target MCU 422 does not allow for the erasing of a single byte (but instead only an entire block of memory), the LCM 422 is arranged to first back up the extra data that is erased. For example, if the target MCU 422 only allows erasing of 1024 bytes at a time, if an update of 4 bytes comes in, the MCU 422 must back up the 1020 bytes that are requested to be modified. At the time of writing the replacement data, if an entire block of memory had to be erased, the LCM 424 at this point instructs the MCU 422 to write the backed-up remaining bytes.

In an embodiment, the RCM 426 comprises a SMS/USSD gateway or system capable of relaying the update message to the LCM 424 via either the mobile device's baseband processor 12 or the SIM card 414.

In an embodiment, the system allows for the updating of the entire firmware on the overlay 420 or a single byte on the MCU 422.

The invention claimed is:
1. A method of authenticating a mobile station on an alternate communications network, the use of the mobile station being associated with a default communications network, the mobile station comprising a baseband processor to manage the antenna related functions of the mobile station and a SIM card to accommodate a default SIM associated with the default communications network for receiving network credentials from the baseband processor, the method comprising:
- providing a SIM card device to intercept communications between the baseband processor and the SIM card;
- monitoring the network credentials in respect of the network that the mobile station is actively in communication with;
- determining whether the mobile station needs to switch to an alternate network, and identifying or receiving from a user the alternate network;
- consulting a SIM bank, comprising at least one alternate SIM, and selecting an alternate SIM having a mobile station identification variable compatible with the alternate network;
- receiving a network authentication request on the mobile station from the alternate network; and
- in response to the mobile station being authenticated on the alternate network, allocating the selected mobile station identification variable to the mobile station so as to identify the user of the mobile station on the alternate network.

2. The method of claim 1, wherein, once authenticated on the alternate network, the method further comprises:
- receiving network credentials for the default network;
- logging onto the default network to receive incoming calls and/or data intended for the default SIM; and
- forwarding the received incoming calls and/or data to the alternate SIM via the alternate network.

3. The method of claim 1, wherein the step of determining whether the mobile station needs to switch to an alternate network comprises either receiving a request from the user to switch to the alternate network or determining that the mobile station is deemed to be roaming.

4. The method of claim 1, wherein the step of receiving a network authentication request on the mobile station from the alternate network includes the steps of:
- the SIM bank relaying the device identification variable to the SIM card device/module;
- the alternate network issuing a device authentication request to the mobile station in the form of a random number;
- relaying the random number to the SIM bank;
- running the random number against an integer stored in the SIM bank to produce a decryption variable;
- transmitting the decryption variable to the SIM card device/module and to the alternate network;
- the alternate network then comparing the received decryption variable with an internally stored decryption variable to determine whether there is a match,
- in response to the received decryption variable matching with said internally stored decryption variable, authenticating the mobile station on the alternate network.

5. The method of claim 1, wherein the SIM bank is an external SIM bank on a SIM server.

6. The method of claim 5, wherein the SIM card device comprises:
- a pseudo-SIM card that can be fitted to a conventional SIM card receiver within the mobile station;
- a SIM receiver to accommodate the default SIM;
- a first communications module and associated antenna to enable the SIM card device/module to communicate with the SIM bank; and
- a processor to monitor the network credentials and determine whether the mobile station needs to switch to the alternate network.

7. The method of claim 1, wherein the SIM bank is integrated into the mobile station, with the SIM card device comprising:
- a body having an alternate SIM embedded therein, the alternate SIM being associated with the alternate network;
- a SIM receiver for receiving or accommodating the default SIM associated with the default network, the default SIM comprising network credentials;
- circuitry to connect the alternate and default SIMs to each other, either physically or wirelessly, and to the rest of the mobile station; and
- a second communications module to extract the network credentials from the default SIM and to transmit the credentials to a remote gateway.

8. The method of claim 7, wherein the SIM receiver is integral or separate from the body.

9. The method of claim 7, wherein the SIM receiver is arranged to receive or accommodate at least one further default SIM associated with further default networks and with each further default SIM also comprising network credentials for the further default networks, with the second communications module being arranged to extract the network credentials from the further default and to transmit these credentials to the remote gateway.

10. The method of claim 1, wherein the network credentials include, IMSI numbers, Ki or other authentication credentials and serial information in respect of the at least one alternate SIM.

11. The method of claim 1, further comprising detecting when a network orientated message has arrived on the user's default SIM, reading the network orientated message, storing the message in a database, and then sending the message to the user's alternate SIM at a designated "message sending" time.

12. The method of claim 1, wherein the SIM card device is located between the baseband processor and the SIM card for intercepting communications between the baseband processor and the SIM card so as to authenticate the mobile device on the alternate communications network.

13. The method of claim 12, wherein the SIM card device comprises an overlay that can be secured to the SIM card, the overlay comprising:
- a communications processor, in which firmware is embedded;
- a substrate upon which the communications processor is mounted and wires are routed; and
- pads that allow for the communications processor to send/receive information to/from the mobile station.

14. The method of claim 13, wherein the method comprises the step of updating the firmware on the communications processor, the communications processor comprising a plurality of memory blocks, each memory block governing an instruction or function associated with the overlay, the method comprising:
- receiving an update message from a remote communications module, the update message comprising the address of the memory block in the communications processor to be updated and a matching list of replacement data that is to replace the existing data in the respective memory block;
- stalling the baseband processor by requesting more processing time;
- instructing the communications processor to erase the data at the address in the memory block that is to be updated;

instructing the communications processor to write the replacement data into the address of the memory block; and once the replacement data has been written into the relevant memory block, instructing the baseband processor to return to normal operating state.

15. A SIM card device for authenticating a mobile station on an alternate communications network, the use of the mobile station being associated with a default communications network, the mobile station comprising a baseband processor to manage the antenna-related functions of the mobile station and a SIM card to accommodate a default SIM associated with the default communications network for receiving network credentials from the baseband processor, the SIM card device comprising a processor to:

monitor the network credentials in respect of the network that the mobile station is actively in communication with;

determine whether the mobile station needs to switch to an alternate network, and identifying or receiving from a user the alternate network;

consult a SIM bank, comprising at least one alternate SIM, and selecting an alternate SIM having a mobile station identification variable compatible with the alternate network;

receive a network authentication request on the mobile station from the alternate network; and in response to the mobile station being authenticated on the alternate network, allocate the selected mobile station identification variable to the mobile station so as to identify the user of the mobile station on the alternate network.

16. The SIM card device of claim 15, wherein, once authenticated on the alternate network, the processor is arranged to:

receive network credentials for the default network;

log onto the default network to receive incoming calls and/or data intended for the default SIM; and forward the received incoming calls and/or data to the alternate SIM via the alternate network.

17. The SIM card device of claim 15, wherein the SIM bank is an external SIM bank on a SIM server.

18. The SIM card device of claim 17, wherein the SIM card device comprises:

a pseudo-SIM card that can be fitted to a conventional SIM card receiver within the mobile station;

a SIM receiver to accommodate the default SIM;

a first communications module and associated antenna to enable the SIM card device/module to communicate with the SIM bank; and a processor to monitor the network credentials and determine whether the mobile station needs to switch to the alternate network.

19. The SIM card device of claim 15, wherein the SIM bank is integrated into the mobile station, with the SIM card device comprising:

a body having an alternate SIM embedded therein, the alternate SIM being associated with the alternate network;

a SIM receiver for receiving or accommodating the default SIM associated with the default network, the default SIM comprising network credentials;

circuitry to connect the alternate and default SIMs to each other, either physically or wirelessly, and to the rest of the mobile station; and a second communications module to extract the network credentials from the default SIM and to transmit the credentials to a remote gateway.

20. The SIM card device of claim 19, wherein the SIM receiver is integral or separate from the body.

21. The SIM card device of claim 19, wherein the SIM receiver is arranged to receive or accommodate at least one further default SIM associated with further default networks and with each further default SIM also comprising network credentials for the further default networks, with the second communications module being arranged to extract the network credentials from the further default and to transmit these credentials to the remote gateway.

22. The SIM card device of claim 15, wherein the network credentials include IMSI numbers, Ki or other authentication credentials and serial information in respect of the at least one alternate SIM.

23. The SIM card device of claim 15, wherein the SIM card device is located between the baseband processor and the SIM card for intercepting communications between the baseband processor and the SIM card so as to authenticate the mobile device on the alternate communications network.

24. The SIM card device of claim 23, wherein the SIM card device comprises an overlay that can be secured to the SIM card, the overlay comprising:

a communications processor, in which firmware is embedded;

a substrate upon which the communications processor is mounted and wires are routed; and pads that allow for the communications processor to send/receive information to/from the mobile station.

25. The SIM card device of claim 24, wherein the SIM card device comprises a local communications manager (LCM) to receive an update message from a remote communications module (RCM) to update the communications processor's firmware.

26. The SIM card device of claim 25, wherein the communications processor comprises a plurality of memory blocks, each memory block governing an instruction or function associated with the overlay.

27. The SIM card device of claim 26, wherein each update message sent by the RCM comprises the address of the memory block in the communications processor to be updated and a matching list of replacement data that is to replace the existing data in the respective memory block.

28. The SIM card device of claim 27, wherein the LCM, upon receiving the update message, determines the address of the memory block in the communications processor to be updated and prepares the overlay for the update.

29. The SIM card device of claim 28, wherein the LCM is arranged to:

stall the baseband processor by requesting more processing time;

instruct the communications processor to erase the data at the address in the memory block that is to be updated;

instruct the communications processor to write the replacement data into the address of the memory block; and once the replacement data has been written into the relevant memory block, instruct the baseband processor to return to normal operating state.

30. The SIM card device of claim 29, wherein if the communications processor does not allow for the erasing of a single byte, the LCM is arranged to first back up the extra data that is erased.

31. The SIM card device of claim 30, wherein the RCM comprises a SMS/USSD gateway or system capable of relaying the update message to the LCM via either the mobile device's baseband processor or the SIM card.

32. The SIM card device of claim 24, which includes a wireless communication module to facilitate wireless communication with at least one external or attached device.

\* \* \* \* \*